(12) United States Patent  
Komori

(10) Patent No.: US 7,502,560 B2  
(45) Date of Patent: Mar. 10, 2009

(54) IMAGE CAPTURING APPARATUS, METHOD FOR RECORDING CAPTURED IMAGE DATA, AND CAPTURED IMAGE DATA PROCESSING APPARATUS AND METHOD

(75) Inventor: Yoko Komori, Kanagawa (JP)

(73) Assignee: Sony Corporation, Tokyo (JP)

( * ) Notice: Subject to any disclaimer, the term of this patent is extended or adjusted under 35 U.S.C. 154(b) by 415 days.

(21) Appl. No.: 11/330,437

(22) Filed: Jan. 11, 2006

(65) Prior Publication Data

US 2006/0164522 A1 Jul. 27, 2006

(30) Foreign Application Priority Data

Jan. 17, 2005 (JP) ............................. P2005-008557

(51) Int. Cl.
*G03B 17/24* (2006.01)
(52) U.S. Cl. .................................... 396/310; 348/222.1
(58) Field of Classification Search ................. 396/310; 348/231.99, 222.1, E17.002; 386/1, 33, 109
See application file for complete search history.

(56) References Cited

U.S. PATENT DOCUMENTS

2005/0134700 A1* 6/2005 Shiraishi .................. 348/222.1
2005/0219382 A1* 10/2005 Abe et al. ............... 348/231.99
2005/0243190 A1* 11/2005 Ogikubo ................. 348/231.99
2006/0023082 A1* 2/2006 Higuchi .................... 348/231.6
2006/0165378 A1* 7/2006 Noda et al. ..................... 386/95

FOREIGN PATENT DOCUMENTS

| JP | 11-164236 | 6/1999 |
| JP | 2002-142189 | 5/2002 |
| JP | 2003-078859 | 3/2003 |
| JP | 2004-186886 | 7/2004 |
| JP | 2004-201247 | 7/2004 |

* cited by examiner

*Primary Examiner*—Christopher E Mahoney
*Assistant Examiner*—Autumn Parker
(74) *Attorney, Agent, or Firm*—Bell, Boyd & Lloyd LLP

(57) ABSTRACT

An image capturing apparatus, method for recording captured image data, and captured image data processing apparatus and method are provided. An image capturing apparatus includes an image capturing device, a compressing unit that compresses image data captured with the image capturing device, an obtaining unit that obtains defect-check information adapted to determine whether or not capturing has failed during the capturing by the image capturing device, and a recording unit that records the defect-check information obtained by the obtaining unit onto a recording medium in association with the corresponding image data compressed by the compressing unit.

24 Claims, 15 Drawing Sheets

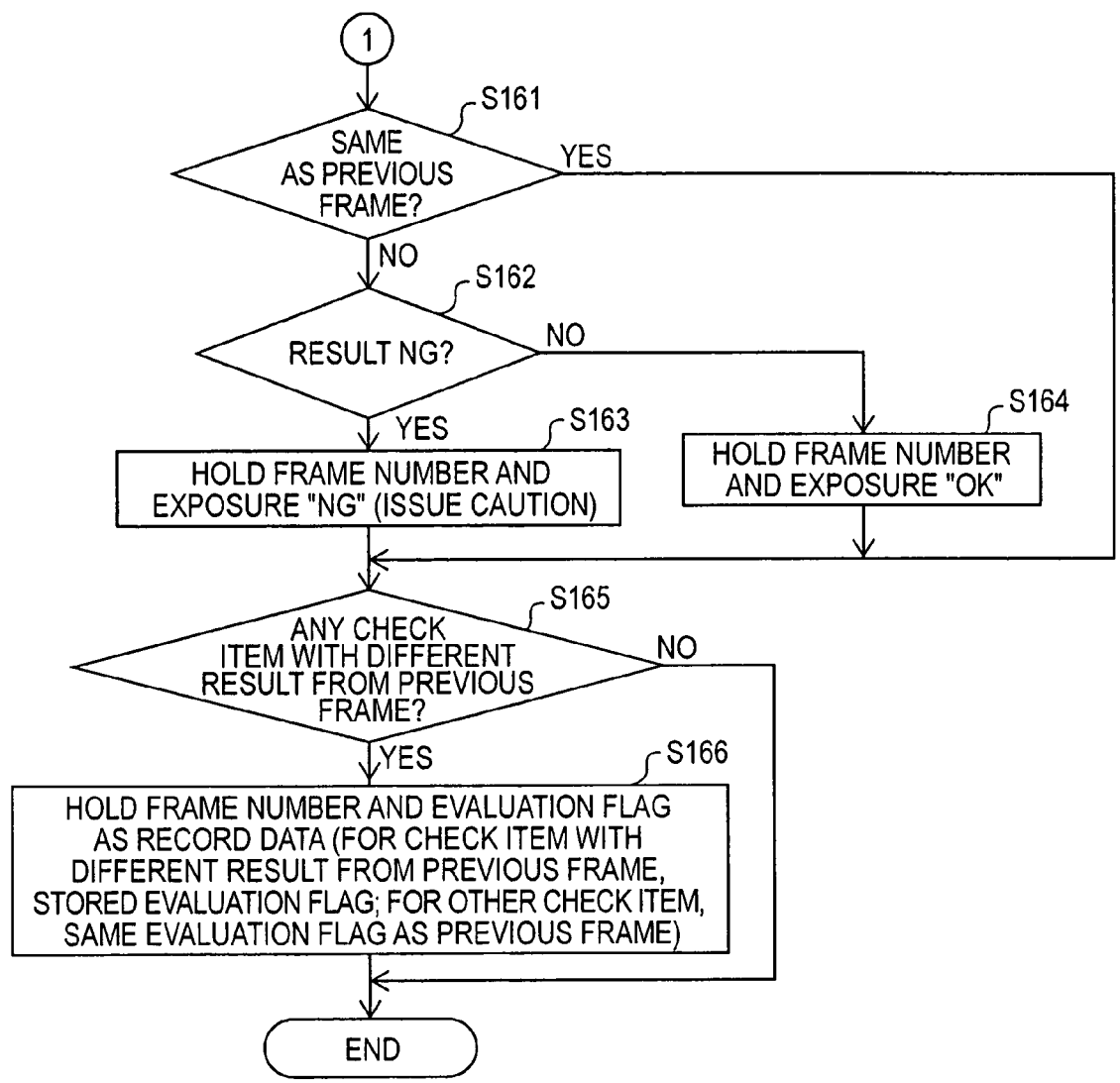

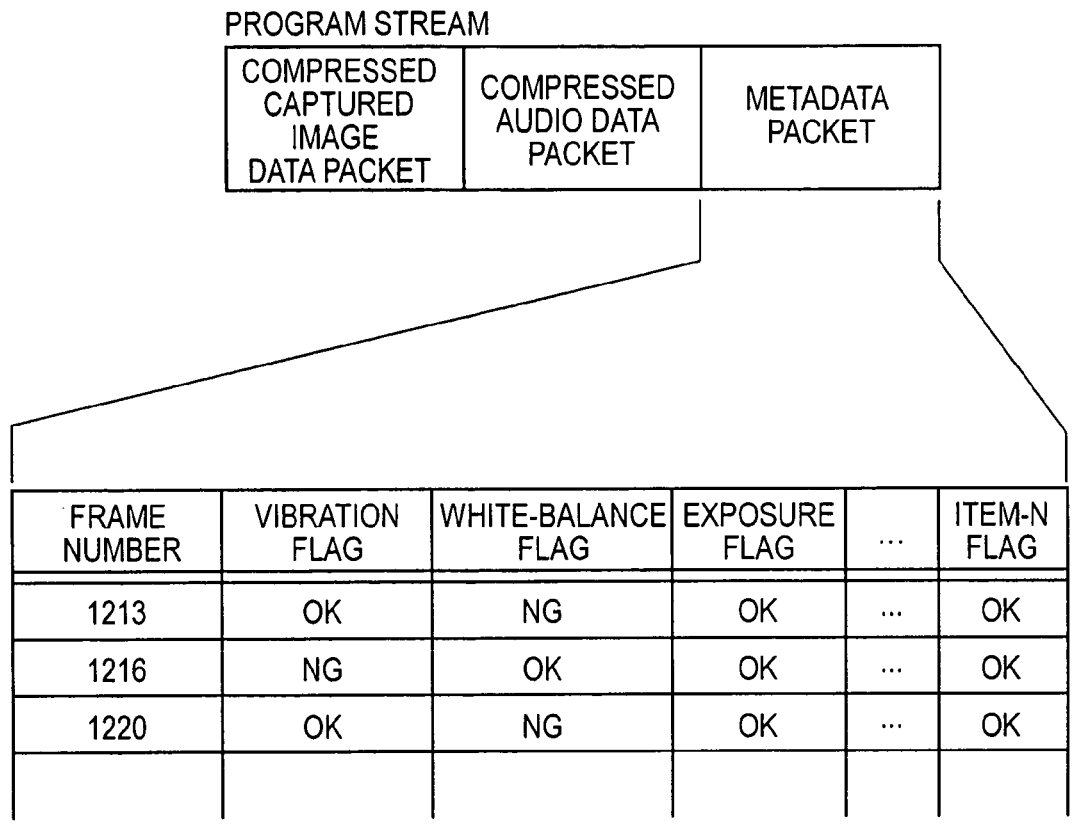

| FRAME NUMBER | EVALUATION FLAG |
|---|---|
| 1213 | OK |
| 1216 | NG |
| 1220 | OK |
|  |  |

| SYSTEM HEADER |
|---|
| VIDEO HEADER |
| VIDEO DATA |
| AUDIO HEADER |
| AUDIO DATA |
| METADATA |

| FRAME NUMBER | VIBRATION FLAG | WHITE-BALANCE FLAG | EXPOSURE FLAG | ... | ITEM-N FLAG |
|---|---|---|---|---|---|
| 1201 | OK | NG | OK | ... | OK |
| 1202 | NG | OK | OK | ... | OK |
| ⋮ | ⋮ | ⋮ | ⋮ | ... | ⋮ |
| 1215 | OK | OK | NG | ... | OK |

| FRAME NUMBER | EVALUATION FLAG |
|---|---|
| 1201 | OK |
| 1202 | NG |
| ⋮ | ⋮ |
| 1215 | OK |

| FILE NO. A | PLAYLIST | FL. No. 00001-FL. No.00350 |
| | | FL. No. 00415-FL. No.01055 |
| | CAPTURED-IMAGE RECORD DATA | ⋮ |
| | | FL. No. 15001-FL. No.16013 |
| FILE NO. B | PLAYLIST | |
| | CAPTURED-IMAGE RECORD DATA | |
| | | |

| FILE NO. A | ORIGINAL CAPTURED-IMAGE RECORD DATA |
| | EDITED CAPTURED-IMAGE RECORD DATA |
| FILE NO. B | ORIGINAL CAPTURED-IMAGE RECORD DATA |
| | EDITED CAPTURED-IMAGE RECORD DATA |
| | |

IMAGE CAPTURING APPARATUS, METHOD FOR RECORDING CAPTURED IMAGE DATA, AND CAPTURED IMAGE DATA PROCESSING APPARATUS AND METHOD

CROSS REFERENCES TO RELATED APPLICATIONS

The present application claims priority to Japanese Patent Application JP 2005-008557 filed in the Japanese Patent Office on Jan. 17, 2005, the entire contents of which is incorporated herein by reference.

BACKGROUND

The present invention relates to image capturing apparatuses, such as digital cameras, methods for recording captured image data, and captured image data processing apparatuses, such as hard disk recorders, and captured image data processing methods.

When capturing and recording images of objects using digital cameras or video cameras, users appropriately adjust the image-capturing conditions, such as the white balance, focus, exposure setting, and zoom ratio, prior to the recording. However, such image-capturing conditions may not always be optimally adjusted or the cameras may be shaken during the photographing operation. Thus, image information is not necessarily recorded under the optimum image-capturing conditions, resulting in image capturing and recording failures under non-optimum image-capturing conditions.

In the related art, when playing back images, camera apparatuses play back even defective images caused by failures in capturing and recording, such as out-of-focus images or images that are too bright or dark to make out much detail.

Such defective images are unnecessary for users. If the unnecessary images are played back, the users are forced to waste unnecessary time in playing back the images.

Improved video cameras that overcome this problem have been proposed. An improved video camera causes a user to select an "OK" or "NG (or not-OK)" option for each captured image when recording images, and records the selected "OK" or "NG" identification signal that is converted into a digital signal onto videotape together with the image data. In an editing and recording mode, a controller of the video camera plays back images while skipping unwanted images according to the "OK" or "NG" identification signals to edit and record the played back images.

The video camera allows an image that is specified as "NG" by user to be skipped, and the skipped image is not included in the edited and recorded data. It is therefore possible to play back only desired images that are specified as "OK" by the user.

In the method employed in this video camera, however, the user needs to select either "OK" or "NG" for each captured image at the time of recording, which is time-consuming. Another problem is that it is difficult to play back images specified as "NG" if requested to do so later because the image data specified as "NG" is not included in the edited and recorded data.

An apparatus that overcomes the problems is disclosed in Japanese Unexamined Patent Application Publication No. 2003-78859. According to a first embodiment of this publication, image-capturing conditions are recorded onto a recording medium together with captured image data to be recorded. At the time of playback, the image-capturing conditions are analyzed, and a defective image portion due to a capturing and recording error is skipped. According to a second embodiment of the above-noted publication, recorded captured image data is analyzed to determine a defective image portion caused by a capturing and recording error, and the defective portion is skipped.

At the time of playback, the apparatus according to the first embodiment of the above-noted publication plays back the data relating to the image-capturing conditions of each of the images to determine whether or not to skip the current image prior to the playback operation, and skips the image that is determined to do so. The apparatus according to the second embodiment of the above-noted publication skips a defective image portion caused by a capturing error that is determined from the played back images.

In this publication, therefore, it is necessary to analyze image-capturing condition information or playback images at the time of playback to determine a playback image to be skipped at the time of playback. A high processing load on the playback apparatus is thus needed.

Further, the image to be skipped is determined from analysis results of the image-capturing condition information or analysis results of playback-image information. For example, if a user desires to play back a slightly defective image, it is difficult to accomplish the desire of the user.

SUMMARY

It is therefore desirable to provide an apparatus and method for easily playing back images while skipping a defective image without performing analysis processing at the time of playback. It is also desirable to provide an apparatus and method for reflecting user's intention in determining a defective image.

An image capturing apparatus according to an embodiment of the present invention includes an image capturing device, compressing means for compressing image data captured with the image capturing device, obtaining means for obtaining, during the capturing by the image capturing device, defect-check information adapted to determine whether or not capturing has failed, and recording means for recording the defect-check information obtained by the obtaining means onto a recording medium in association with the corresponding image data compressed by the compressing means.

Therefore, the defect-check information is recorded together with the compressed captured image data. The defect-check information allows easy playback of the compressed captured image while skipping a defective image without performing analysis processing at the playback time.

According to an embodiment of the present invention, the image capturing apparatus may have an editing mode in which the defect-check information recorded by the recording means in association with the compressed image data is retrieved from the recording medium to generate image playback range information based on the defect-check information, the image playback range information allowing only images other than an image for which it is determined that capturing has failed to be played back, and the generated image playback range information is recorded onto the recording medium.

Therefore, in the editing mode, image playback range information indicating a range in which images are to be played back is generated and recorded onto a recording medium. The image playback range information allows the playback section to play back images while skipping a defective image.

According to an embodiment of the present invention, in the editing mode, an image corresponding to the defect-check information retrieved from the recording medium may be played back from the compressed image data retrieved from the recording medium, and may be presented to a user to prompt the user to confirm whether or not the played back image is set as a defective image. The confirmation from the user may also be used to generate the image playback range information, and the generated image playback range information may be recorded onto the recording medium.

Therefore, it is possible to reflect user's intention in generating the image playback range information from the defect-check information.

According to an embodiment of the present invention, the image capturing apparatus may have an editing mode in which the defect-check information recorded by the recording means in association with the compressed image data is retrieved from the recording medium, and the defect-check information is used to update the image data recorded on the recording medium to image data from which an image portion for which it is determined that capturing has failed has been removed.

Therefore, image data from which an image portion for which it is determined that capturing has failed has been removed is recorded on the recording medium. Thus, it is only required on the playback section to play back the recorded image data in order to play back only defect-free images.

According to an embodiment of the present invention, in the editing mode, an image corresponding to the defect-check information retrieved from the recording medium may be played back from the compressed image data retrieved from the recording medium, and may be presented to a user to prompt the user to confirm whether or not the played back image is set as a defective image. The confirmation from the user may also be used to update the image data recorded on the recording medium.

Therefore, it is possible to reflect user's intention in determining a defective image in order to record image data including only defect-free images onto the recording medium according to the defect-check information.

Accordingly, an apparatus and method for easily playing back images while skipping defective images without performing analysis processing at the time of playback are provided. Furthermore, advantageously, user's intention is reflected in determining a defective image.

Additional features and advantages are described herein, and will be apparent from, the following Detailed Description and the figures.

BRIEF DESCRIPTION OF THE FIGURES

FIG. 6 is a flowchart showing the details of the metadata generation process shown in FIG. 3.

FIG. 7 is a diagram showing an exemplary multiplexing format of metadata used in the image capturing apparatus shown in FIG. 1.

FIG. 8 is a diagram showing another example metadata according to the embodiment.

DETAILED DESCRIPTION

An image capturing apparatus according to an embodiment of the present invention will be described hereinafter with reference to the drawings in the context of a digital camera apparatus using a random-accessible disk medium as a recording medium. The image capturing apparatus according to the following embodiment includes an implementation of a captured image data processing apparatus and an implementation of a captured image data processing method.

FIRST EMBODIMENT

Figure 1:
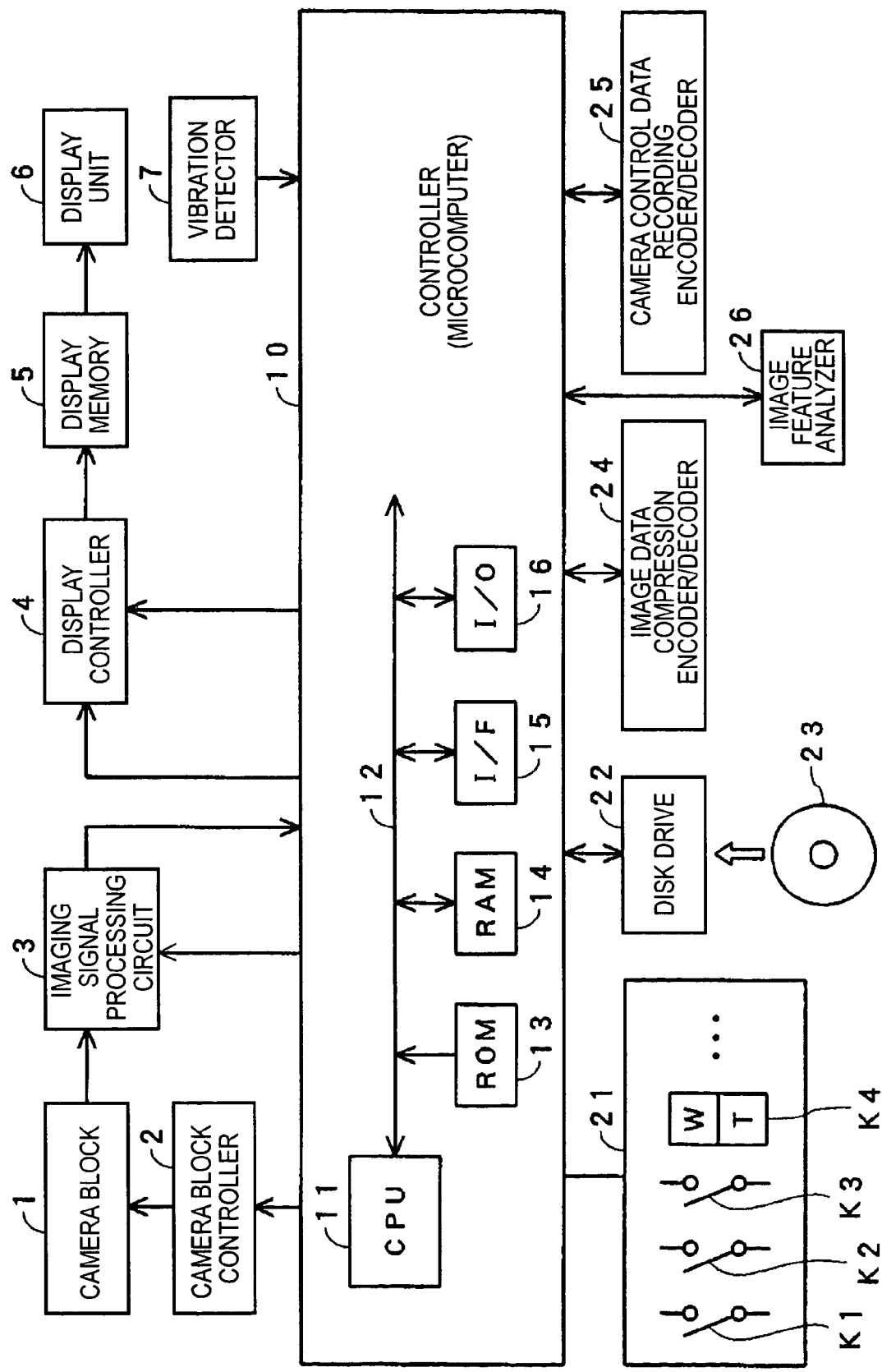
FIG. 1 is a block diagram of an image capturing apparatus according to an embodiment of the present invention.

FIG. 1 is a block diagram showing an example structure of a digital camera apparatus implemented as an image capturing apparatus according to a first embodiment of the present invention. The image capturing apparatus according to the first embodiment is configured to pick up ambient sound during the video capturing operation to produce an audio signal and to compress and record the audio signal. In FIG. 1, the system for processing and recording the audio signal is omitted for simplicity of illustration.

The digital camera apparatus of the first embodiment includes a camera block 1, a camera block control circuit 2 that supplies a control signal to the camera block 1, an imaging signal processing circuit 3, a display controller 4, a display memory 5, a display unit 6 composed of, for example, a liquid crystal display (LCD), and a vibration detector 7. The digital camera apparatus further includes an operation input unit 21, a disk drive 22 operable to access a disk medium 23, which is an exemplary recording medium, an image signal compression encoder/decoder 24, a camera control data recording encoder/decoder 25, an image feature analyzer 26, and a controller 10 composed of a microcomputer operable to control the overall apparatus.

Although not shown in FIG. 1, the camera block 1 includes a lens unit, a focus mechanism, a zoom mechanism, an iris mechanism, a shutter, a color filter, and a charge coupled device (CCD) serving as an imaging device. An imaging signal output from the CCD is supplied to the imaging signal processing circuit 3.

In response to a signal from the imaging signal processing circuit 3 or a camera control signal from the controller, 10, the camera block control circuit 2 controls the camera block 1 to perform iris control, shutter control, focus control, zoom control, or the like. The camera control signal is generated by the controller 10 based on an operation input via the operation input unit 21.

The imaging signal processing circuit 3 includes an analog-to-digital (A/D) converting circuit, a luminance signal processing circuit, a chrominance signal processing circuit, an automatic-iris-control signal generating circuit, an automatic-focus-control signal generating circuit, and a white-balance adjusting circuit. An output of the imaging signal processing circuit 3 is supplied to the controller 10.

In the imaging signal processing circuit 3, the A/D converting circuit converts the imaging signal output from the CCD into a digital signal. The digital signal is further converted into a component digital image signal composed of a luminance signal and a color-difference signal, and the resulting digital image signal is supplied to the controller 10. The controller 10 generates a display signal from the digital image signal, and supplies the display signal to the display unit 6 composed of an LCD via the display controller 4 and the display memory 5 to display an image on a display screen of the display unit 6.

The vibration detector 7 detects, as vibration or camera shake, comparatively rapid changes at a predetermined speed or higher in position of the imaging device in the camera block 1 in the horizontal direction and/or the vertical direction of a captured image, and determines a velocity vector. The comparatively rapid position changes are detected so that images photographed by panning (moving in a horizontal plane) or tilting (moving in a vertical plane) the image capturing apparatus in response to an user operation may not be detected as blurry images induced from unwanted vibration or camera shake.

The vibration detector 7 includes an angular velocity sensor mounted on, for example, a housing of the image capturing apparatus. The vibration detector 7 detects and outputs the amount of vibration that is determined by integrating the vibration velocity vector with respect to time on a frame-by-frame basis (or on a field-by-field basis, hereinafter, on a frame-by-frame basis). In place of the angular velocity sensor, the vibration detector 7 may include an acceleration sensor. When an acceleration sensor is used, an acceleration sensor value (including directional components) is integrated to determine the vibration velocity (vibration velocity vector).

The controller 10 loads the detection output of the vibration detector 7 during the video capturing operation, and checks for the occurrence of vibration during the capturing operation. In the first embodiment, the controller 10 loads (or samples) the vibration detection output a plurality of times for a period of one frame, and checks the images for the occurrence of vibration on a frame-by-frame basis.

The controller 10 further controls the camera block controller 2 in response to the automatic-focus-control signal from the imaging signal processing circuit 3 to perform automatic focus (auto-focus) control. The controller 10 further controls the camera block controller 2 in response to the automatic-iris-control signal from the imaging signal processing circuit 3 to perform iris control to obtain an appropriately bright image. The controller 10 supplies a white-balance-adjustment signal to the imaging signal processing circuit 3 to perform white-balance control.

The operation input unit 21 includes recording instruction operation means of the first embodiment, including a capture-start/stop button K1, an edit button K2, and a metadata adding request button K3, and other operation units, such as a zoom button K4 and a playback button.

The capture-start/stop button K1 is operable to instruct the start and stop of the video capturing operation. Each time the button K1 is pressed, the video capturing operation alternately starts and stops. In the first embodiment, as discussed below, during the video capturing operation, defect-check information (metadata) for determining whether or not a scene being captured is defective is automatically generated and recorded together with captured image data.

In the first embodiment, when the edit button K2 is operated, the image capturing apparatus enters an editing mode, and edit menu options are first displayed on the display unit 6. The edit menu options include, for example, playlist creation and defective image deletion, each having automatic and manual modes. The details of the editing mode are discussed below.

The metadata adding request button K3 is pressed to add the defect-check information to the captured image data recorded on the disk medium 23. Therefore, the metadata adding request button K3 is used when the disk medium 23 is recordable and playable by the image capturing apparatus of the first embodiment and when the defect-check information is not recorded on the disk medium 23 because the captured image data was recorded onto the disk medium 23 by an image capturing apparatus different from the image capturing apparatus of the first embodiment.

In the first embodiment, when the metadata adding request button K3 is pressed, as discussed below, the captured image data recorded on the disk medium 23 is analyzed to generate metadata from analysis results, and the generated metadata is recorded onto the disk medium 23 in association with the captured image. The operation in response to the depression of the metadata adding request button K3 is discussed in detail below.

The zoom button K4 is designed as, for example, a seesaw button such that an end of the button is pressed to change the focal length to the "wide" (short focus=wide angle) position and the other end of the button is pressed to change the focal length to the "tele" (long focus=telephoto) position.

The disk drive 22 of the first embodiment is compatible with disks, such as compact disc-recordables (CD-Rs) measuring 8 cm in diameter, compact disc-rewritables (CD-RWs), or digital versatile disc (DVDs), which are implementations of the disk medium 23.

The image signal compression encoder/decoder 24 is a circuit operable to compress image data at the time of capturing and recording and to decode compressed image data at the time of playback. In the first embodiment, for example, an MPEG (Moving Picture Experts Group) technique is employed as a video compression method.

In the first embodiment, image-capturing condition data is recorded at the time of capturing and recording. In this embodiment, camera control data is recorded as the image-capturing condition data. The camera control data includes iris control data, shutter speed data, focus control data, zoom control data, and white-balance adjustment data.

The camera control data recording encoder/decoder 25 appropriately encodes the camera control data to be recorded, and decodes encoded camera control data read from the disk medium 23 at the time of playback.

The controller 10 is composed of a microcomputer, as described above. A system bus 12 is connected to a central processing unit (CPU) 11, and a program read-only memory (ROM) 13, a work-area random access memory (RAM) 14, various interfaces 15, such as an operation-input-unit interface and a disk-drive interface, and an input/output (I/O) port 16 for inputting and outputting data are connected to the system bus 12.

The image feature analyzer 26 extracts features of the image data read from the disk medium 23, and analyzes the extracted features. The extracted features are represented by means of frequency distribution for the in-focus or out-of-focus state, or signal level distribution for the image brightness or darkness (hereinafter referred to as "check items".

In response to a metadata adding request from the user, the controller 10 retrieves a captured image recorded on the disk medium 23, and causes the image feature analyzer 26 to analyze the retrieved image. The controller 10 generates metadata for determining whether or not the captured image is defective based on an analysis result from the image feature analyzer 26, and records the generated metadata onto the disk medium 23 in association with the retrieved captured image data.

The controller 10 further implements functions, such as camera control, capturing and recording control, playback control, camera control data recording control, editing control, and metadata adding control, according to programs stored in the ROM 13.

Figure 2:
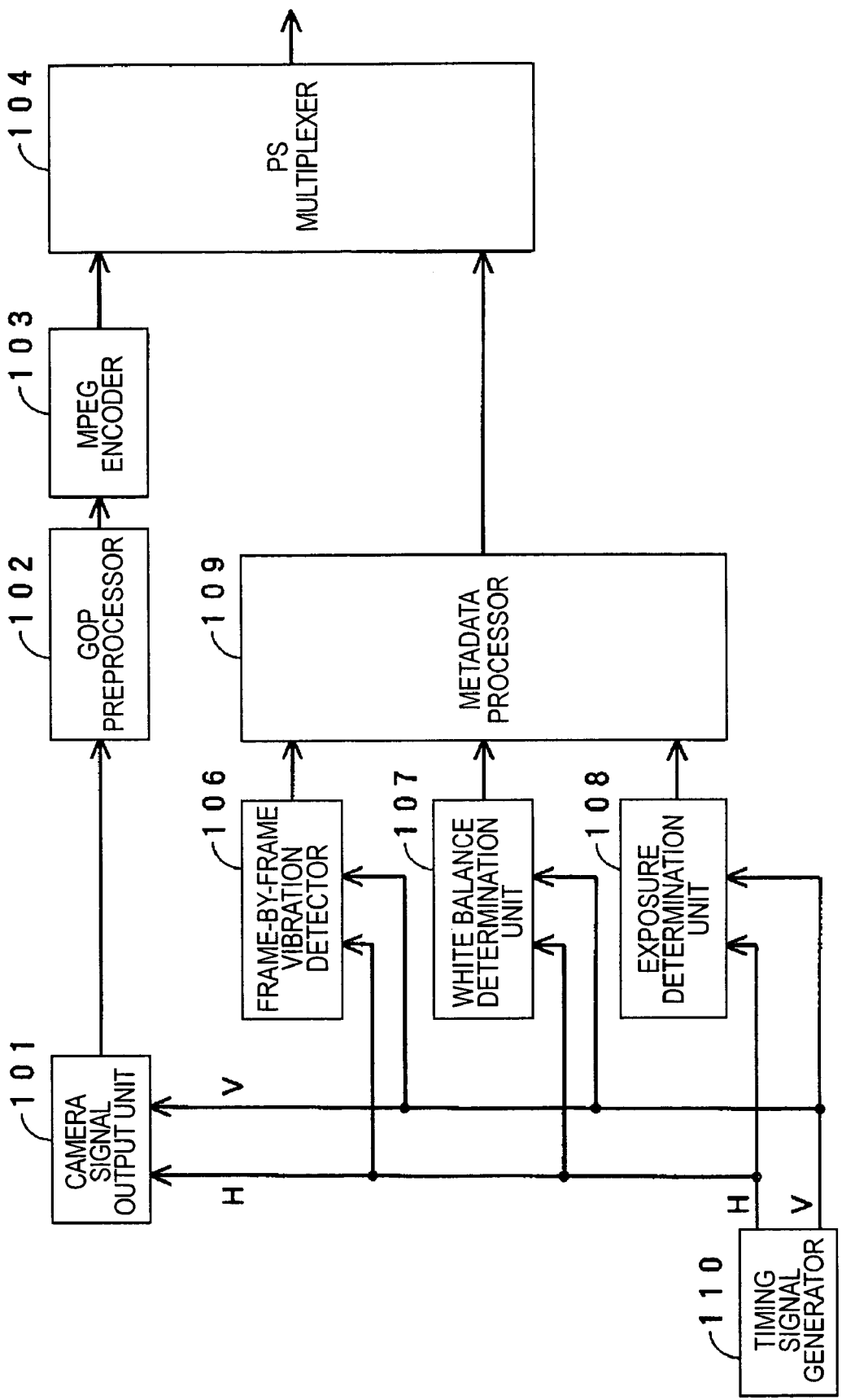
FIG. 2 is a block diagram of an image-capturing and recording function of the image capturing apparatus shown in FIG. 1.

FIG. 2 is a block diagram of the capturing and recording control function of the digital camera apparatus, which is an implementation of the image capturing apparatus according to the first embodiment.

In FIG. 2, a camera signal output unit 101 includes the camera block 1, the camera block controller 2, and the imaging signal processing circuit 3, and outputs a captured image signal. A horizontal synchronization signal H and a vertical synchronization signal V are supplied to the camera signal output unit 101 from a timing signal generator 110.

The captured image signal from the camera signal output unit 101 is supplied to a GOP preprocessor 102. The GOP preprocessor 102 converts the captured image signal into a digital signal, and performs preprocessing on MPEG image data compression to generate groups of pictures (GOPs), each GOP consisting of, for example, 15 frames of the captured image data. In GOP, frames (or fields, hereinafter, frames) of the captured image data are rearranged in a predetermined order for the purpose of MPEG compression.

The captured image data transferred on a GOP-by-GOP basis from the GOP preprocessor 102 is supplied to an MPEG encoder 103, and is then MPEG-compressed and encoded. A program stream of the compressed captured image data is supplied to a program stream (PS) multiplexer 104.

In the first embodiment, in parallel to the processing of the captured image data, the metadata is generated in the manner described above. In order to generate the metadata, in the first embodiment, a frame-by-frame vibration detector 106, a white-balance determination unit 107, and an exposure determination unit 108 are provided. The horizontal synchronization signal H and the vertical synchronization signal V are supplied to the frame-by-frame vibration detector 106, the white-balance determination unit 107, and the exposure determination unit 108 from the timing signal generator 110 as a sampling reference signal and a transfer-timing signal.

The frame-by-frame vibration detector 106 samples vibration detection outputs at the timing of the horizontal synchronization signal H or at a timing at which the horizontal synchronization signal H is frequency-divided, and performs processing on the sampled outputs, such as integration and averaging, to determine whether or not vibration has occurred. The white-balance determination unit 107 samples white-balance adjustment values at the timing of the horizontal synchronization signal H or at a timing at which the horizontal synchronization signal H is frequency-divided, and performs processing on the sampled values, such as integration and averaging, to determine whether or not white-balance adjustment has been correctly performed. The exposure determination unit 108 samples exposure values at the timing of the horizontal synchronization signal H or at a timing at which the horizontal synchronization signal H is frequency-divided, and performs processing on the sampled values, such as integration and averaging, to determine whether or not exposure has correctly been adjusted.

The frame-by-frame vibration detector 106, the white-balance determination unit 107, and the exposure determination unit 108 supply the individual determination outputs to a metadata processor 109 in synchronization with the vertical synchronization signal V.

The vibration determination outputs, the white-balance adjustment determination outputs, and the exposure adjustment determination outputs for all frames may be recorded as metadata. In this embodiment, however, as discussed below, when a determination output of a given frame is different from that of the previous frame, the value of the determination output for the given frame and the frame number of the given frame are recorded in association with each other, thus reducing the amount of recorded data.

The metadata processor 109 monitors the determination outputs from the vibration detector 106, the white-balance determination unit 107, and the exposure determination unit 108 on a frame-by-frame basis, and detects a frame whose determination output is different from that of the previous frame. The metadata processor 109 further records the determination output of the detected frame as metadata.

The recorded metadata is supplied from the metadata processor 109 to the PS multiplexer 104. The PS multiplexer 104 packetizes the compressed captured image data, audio data that is compressed by a processor block (not shown), and the metadata into image data packets, audio data packets, and metadata packets, respectively, and multiplexes the resulting packets. The multiplexed data output from the PS multiplexer 104 is recorded onto the disk medium 23.

Next, a capturing and recording operation (including a metadata generation process), an operation in response to an instruction to add metadata, and an editing operation of the digital camera apparatus, which is an implementation of the image capturing apparatus according to the first embodiment, will be described.

FIGS. 3 to 6 are flowcharts showing the capturing and recording operation, the operation in response to an instruction to add metadata, and the editing operation of the digital camera apparatus according to the first embodiment. The steps shown in the flowcharts of FIGS. 3 to 6 are executed mainly by the CPU 11 in the controller 10 according to the program stored in the ROM 13 using the RAM 14 as a work area.

Capturing and Recording Operation

First, the CPU 11 determines whether or not the image capturing apparatus enters a capturing/recording mode in response to a user operation via the operation input unit 21 (step S101). If it is determined that the image capturing apparatus is in the capturing/recording mode, the CPU 11 waits for the user to instruct the start of the capturing and recording operation via the operation input unit 21 (step S102). If it is determined that an instruction to start the capturing and recording operation has been issued, as discussed above, captured image data and audio data are compressed (step S103), and the compressed captured image data and audio data are packetized into packets (step S104).

Along with the processing of compressing the captured image data and the audio data, the metadata generation process is performed (step S105), and generated metadata is packetized into packets (step S106).

The packets of the compressed captured image data, the packets of the compressed audio data, and the packets of the metadata are multiplexed (step S107). The resulting data is recorded onto a disk medium (step S108).

Then, it is determined whether or not an instruction to stop the capturing and recording operation has been issued by the user from the operation input unit 21 (step S109). If it is determined that the instruction to stop the capturing and recording operation has not been issued, the flow returns to steps S103 and S105, and the parallel processing of recording the captured image data, the audio data, and the metadata is repeatedly performed.

If it is determined in step S109 that the instruction to stop the capturing and recording operation has been issued, the CPU 11 determines whether or not an instruction to change to another mode has been issued (step S110). If it is determined that the instruction to change to another mode has not been issued, the flow returns to step S102, and it is determined whether or not an instruction to start the next round of the capturing and recording operation has been issued. Thereafter, the processing after step S102 is repeatedly performed.

Figure 4:
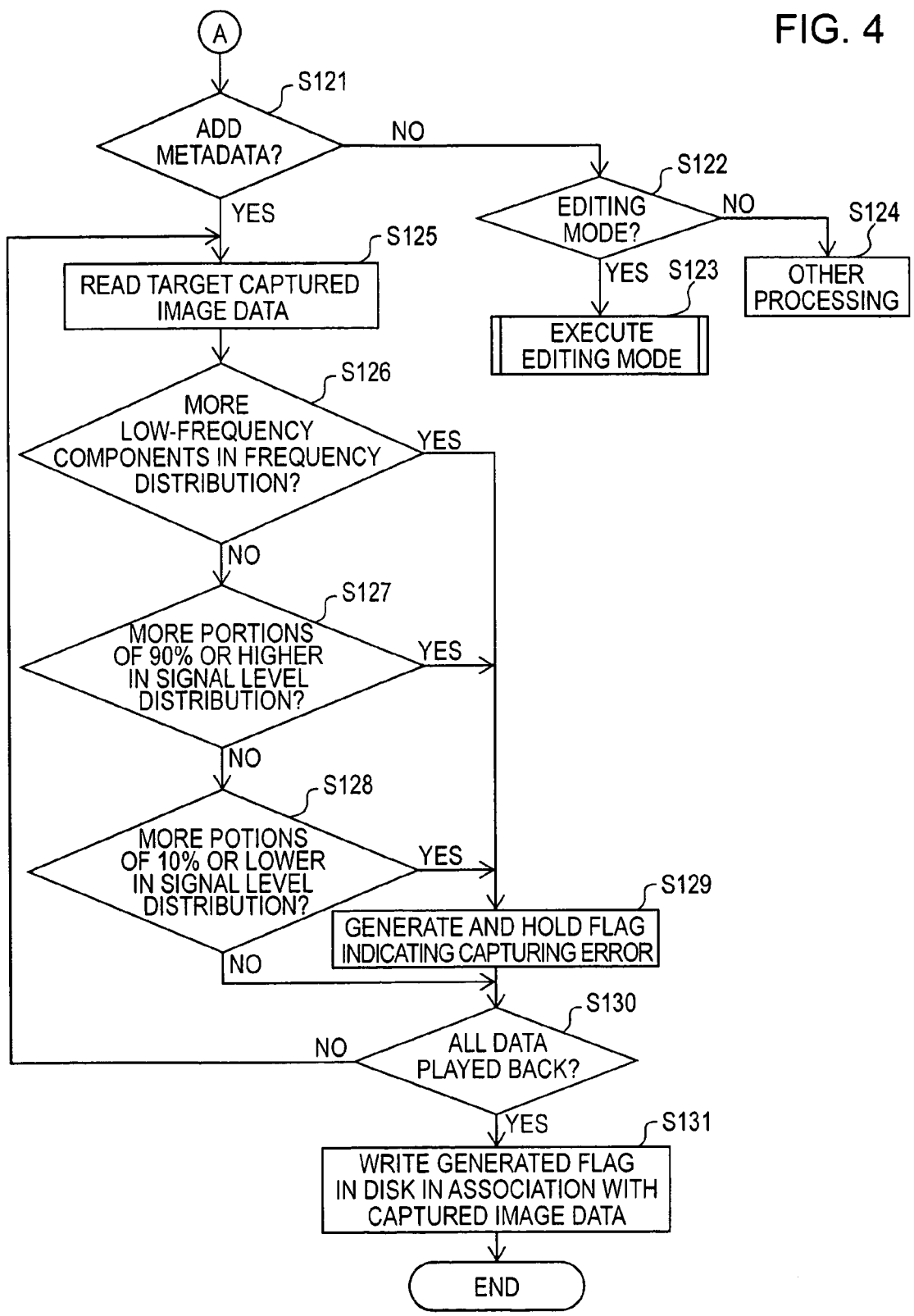
FIG. 4 is a flowchart showing the operation of the image capturing apparatus shown in FIG. 1 to capture and record an image.

If it is determined in step S110 that the instruction to change to another mode has been issued, the CPU 11 determines whether or not an instruction to add metadata has been issued (step S121 shown in FIG. 4). When it is determined in step S101 that the image capturing apparatus is not in the capturing/recording mode, the flow also proceeds to step S121.

If it is determined in step S121 that the instruction to add metadata has not been issued, it is determined whether or not the editing mode has been selected (step S122). If it is determined that the editing mode has been selected, an editing-mode operation, discussed below, is executed (step S123). If it is determined that the editing mode has not been selected, other requested processing is performed (step S124).

Operation in Response to Metadata Add Instruction

If it is determined in step S121 that the instruction to add metadata has been issued, the controller 10 retrieves target captured image data to which the metadata is to be added from the disk medium 23 (step S125), and transfers it to the image feature analyzer 26. The image feature analyzer 26 extracts the features described above from the received image data for analysis, and returns analysis results to the controller 10.

Then, the controller 10 determines whether or not the retrieved image is a good image based on the received analysis results. If it is determined that the image is a bad image, this image is skipped. Specifically, first, in step S126, the frequency distribution in the received analysis results is reviewed to determine whether or not the number of low-frequency components is greater than a threshold value. An image with a large number of low-frequency components means an out-of-focus image.

The threshold value used for the determination in step S126 may be a predetermined fixed value or may be selected by the user.

If it is determined in step S126 that the number of low-frequency components is greater than the threshold value, the flow proceeds to step S129, and the CPU 11 generates and stores a flag indicating that the current frame or scene of the target image is caused by a capturing error. Then, it is determined whether or not all target image data to which the metadata is to be added have been played back from the disk medium 23 (step S130). If it is determined that all target image data have not been played back, the flow returns to step S125, and the processing after step S125 is repeatedly performed.

If it is determined in step S126 that the number of low-frequency components is not greater than the threshold value and the retrieved image is not an out-of-focus image, the flow proceeds to step S127. In step S127, the signal level distribution in the analysis data received from the image feature analyzer 26 is reviewed to determine whether or not the number of bright portions of 90% or higher in the signal level distribution is greater than a threshed value to render the image too bright to make out much detail.

The threshold value used for the determination in step S127 may be a predetermined fixed value or may be selected by the user.

If it is determined in step S127 that the number of bright portions of 90% or higher in the signal level distribution is greater than the threshold value, the flow proceeds to step S129, and the CPU 11 generates and stores a flag indicating that the current frame or scene of the target image is caused by a capturing error. Then, it is determined whether or not all target image data to which the metadata is to be added have been played back from the disk medium 23 (step S130). If it is determined that all target image data have not been played back, the flow returns to step S125, and the processing after step S125 is repeatedly performed.

If it is determined in step S127 that the number of bright portions of 90% or higher in the signal level distribution is not greater than the threshold value, the flow proceeds to step S128. In step S128, it is determined whether or not the number of dark portions of 10% or lower in the signal level distribution is greater than a threshold value to render the image too dark to make out much detail. The threshold value used for the determination in step S128 may be a predetermined fixed value or may be selected by the user.

If it is determined in step S128 that the number of dark portions of 10% or lower in the signal level distribution is greater than the threshold value, the flow proceeds to step S129, and the CPU 11 generates and stores a flag indicating that the current frame or scene of the target image is caused by a capturing error. Then, it is determined whether or not all target image data to which the metadata is to be added have been played back from the disk medium 23 (step S130). If it is determined that all target image data have not been played back, the flow returns to step S125, and the processing after step S125 is repeatedly performed.

If it is determined in step S128 that the number of dark portions of 10% or lower in the signal level distribution is not greater than the threshold value, that is, it is determined that the retrieved image is not an out-of-focus image or is not too bright or dark, the flow proceeds to step S130, and it is determined whether or not all target image data to which the metadata is to be added have been played back from the disk medium 23. If it is determined that all target image data have not been played back, the flow returns to step S125, and the processing after step S125 is repeatedly performed.

If it is determined in step S130 that all target image data to which the metadata is to be added have been played back from the disk medium 23, the flag generated and stored in step S129 is recorded onto the disk medium 23 in association with the target captured image data.

Accordingly, when the captured image data recorded on the disk medium 23 includes no metadata, the features of the captured image data are analyzed to generate metadata as to whether or not the image is a defective image caused by a capturing error according to analysis results. The generated metadata can be added to the captured image data.

That is, it is determined whether or not the recorded image is a defective image due to a capturing error, such as an out-of-focus image or an image that is too bright or dark to make out much detail. If it is determined that the image is a defective image, a defect-identification flag is additionally recorded in association with the defective image. As discussed below, the defect-identification flag is used to skip the scene that is determined to be defective at the time of playback so that only the well-captured image portions can be played back. This arrangement allows only defect-free good images to be automatically extracted and rapidly played back.

Metadata Generation Process

Figure 3:
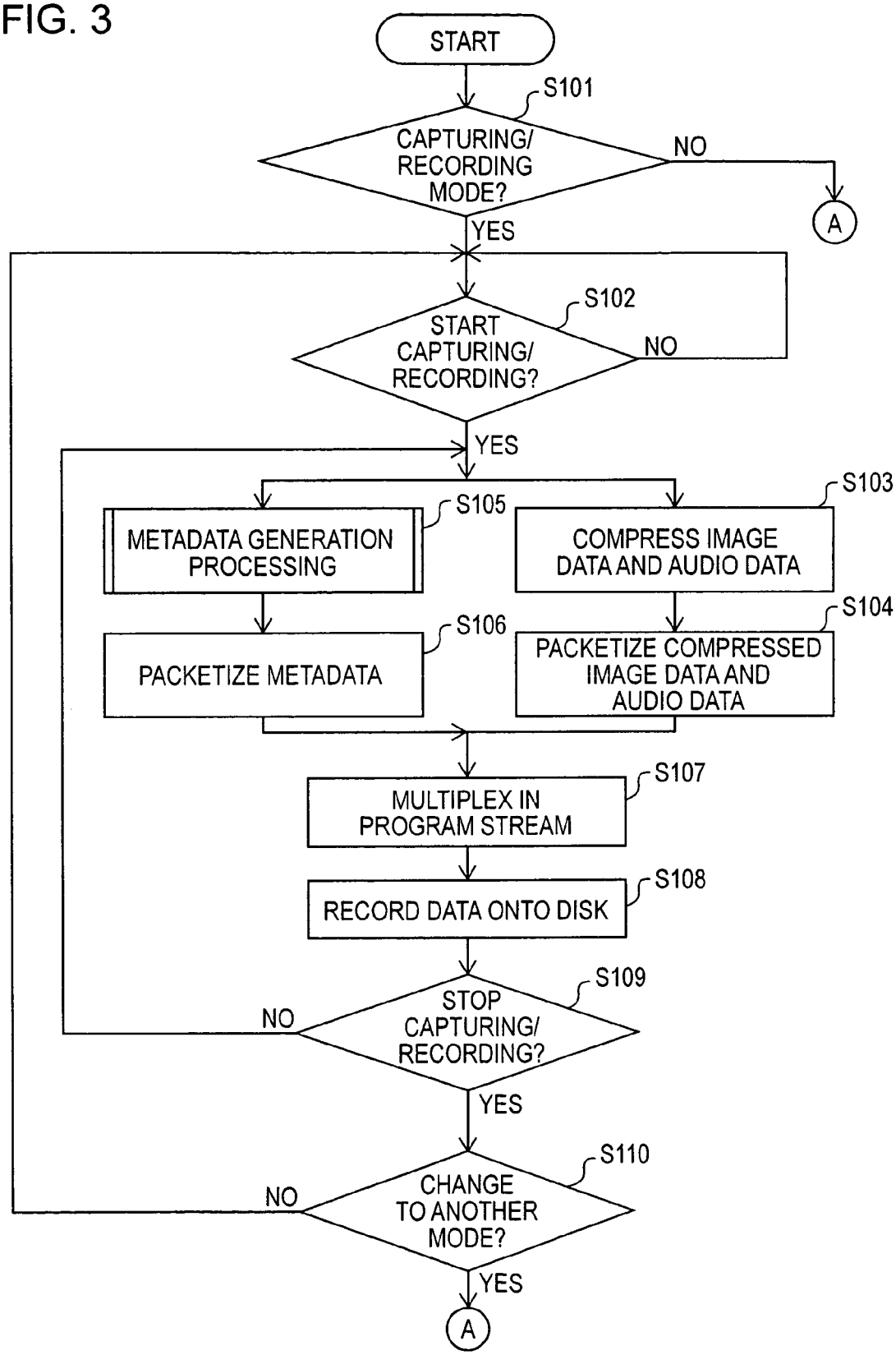
FIG. 3 is a flowchart showing an operation of the image capturing apparatus shown in FIG. 1 to capture and record an image.
Figure 5:
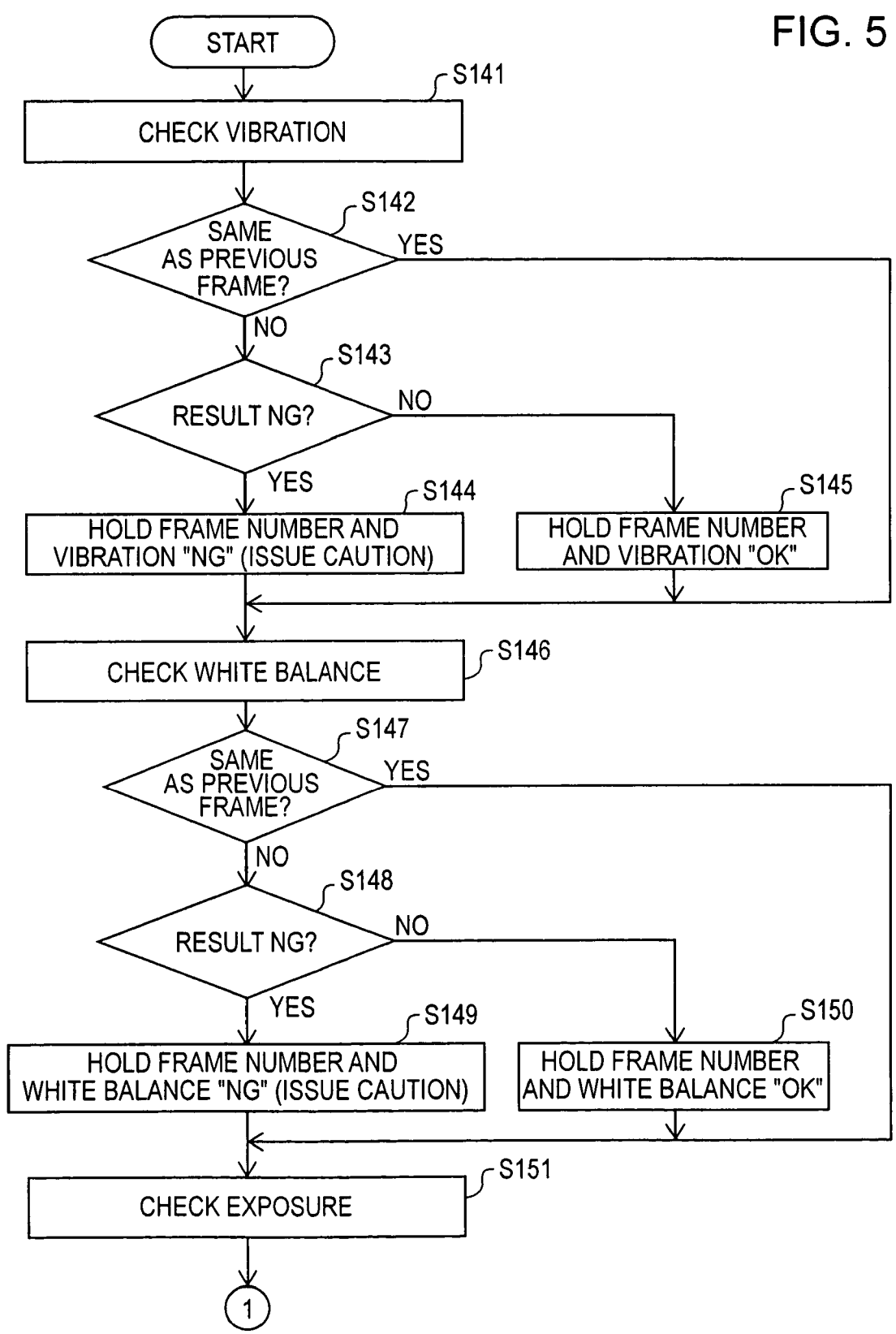
FIG. 5 is a flowchart showing the details of a metadata generation process shown in FIG. 3.

The details of the metadata generation process in step S105 shown in FIG. 3 will now be described with reference to a flowchart shown in FIGS. 5 and 6. The process shown in FIGS. 5 and 6 is performed on a frame-by-frame basis, for example, at the end of each frame. The process shown in FIGS. 5 and 6 is also performed by the CPU 11 according to the program stored in the ROM 13 using the RAM 14 as a work area.

The CPU 11 loads the detection output of the vibration detector 7 in the manner described above, and check for the occurrence of vibration that causes a defective image based on the amount of vibration per frame (corresponding to an evaluation value) (step S141). In this embodiment, a result of the check is represented by an evaluation flag (in the case of vibration, a vibration flag). The evaluation flag assigned to a frame of a defective image captured with vibration indicates "NG", and the evaluation flag assigned to a frame of a defect-free image captured without vibration indicates "OK".

Then, it is determined whether or not the check result obtained in step S141 is the same as the check result of the previous frame (step S142). If it is determined in step S142 that the check result is different from the check result of the previous frame, the CPU 11 determines whether or not the evaluation flag of the different check result indicates "NG" (step S143).

If it is determined in step S143 that the evaluation flag of the check result indicates "NG", an evaluation flag indicating "NG" for the check item "vibration" is stored in association with the number of the current frame (hereinafter referred to as a "frame number") (step S144). At this time, the CPU 11 cautions the user that the captured image may be a defective image captured with vibration by beep sound or a specific visual indication displayed in a finder.

If it is determined in step S143 that the evaluation flag of the check result indicates "OK", an evaluation flag indicating "OK" for the check item "vibration" is stored in association with the frame number (step S145).

After storing the frame number and the evaluation flag for the check item "vibration" in steps S144 and S145, or if it is determined in step S142 that the check result is the same as the check result of the previous frame, the CPU 11 determines whether or not the optimum white-balance adjustment is set in the image-capturing conditions (step S146).

The CPU 11 determines whether or not the white-balance adjustment value set by the user is correct. In this embodiment, a result of the check is represented by an evaluation flag (in the case of white-balance adjustment, a white-balance flag). The evaluation flag assigned to a frame of a defective image captured with an incorrect white-balance adjustment value indicates "NG", and the evaluation flag assigned to a frame of a defect-free image captured with a correct white-balance adjustment value indicates "OK".

Then, it is determined whether or not the check result obtained in step S146 is the same as the check result of the previous frame (step S147). If it is determined in step S147 that the check result is different from the check result of the previous frame, the CPU 11 determines whether or not the evaluation flag of the different check result indicates "NG" (step S148).

If it is determined in step S148 that the evaluation flag of the check result indicates "NG", an evaluation flag indicating "NG" for the check item "white balance" is stored in association with the number of the current frame (hereinafter referred to as a "frame number") (step S149). At this time, the CPU 11 cautions the user that the captured image may be a defective image captured with incorrect white-balance adjustment by beep sound (which may or may not be the same as the beep sound in the case of vibration) or a specific visual indication (which may or may not be the same as the visual indication in the case of vibration) displayed in the finder.

If it is determined in step S148 that the evaluation flag of the check result indicates "OK", an evaluation flag indicating "OK" for the check item "white balance" is stored in association with the frame number (step S150).

After storing the frame number and the evaluation flag for the check item "white balance" in steps S149 and S150, or if it is determined in step S147 that the check result is the same as the check result of the previous frame, the CPU 11 determines whether or not the optimum exposure value is set in the image-capturing conditions (step S151).

In this embodiment, a result of the check for exposure adjustment is represented by an evaluation flag (in the case of exposure adjustment, an exposure-adjustment flag). The evaluation flag assigned to a frame of a defective image captured with an incorrect exposure value indicates "NG", and the evaluation flag assigned to a frame of a defect-free image captured with a correct exposure value indicates "OK".

Then, it is determined whether or not the check result obtained in step S151 is the same as the check result of the previous frame (step S161). If it is determined in step S161 that the check result is different from the check result of the previous frame, the CPU 11 determines whether or not the evaluation flag of the different check result indicates "NG" (step S162).

If it is determined in step S162 that the evaluation flag of the check result indicates "NG", an evaluation flag indicating "NG" for the check item "exposure adjustment" is stored in association with the number of the current frame (hereinafter referred to as a "frame number") (step S163). At this time, the CPU 11 cautions the user that the captured image may be a defective image captured with incorrect exposure adjustment by beep sound (which may or may not be the same as the beep sound in the case of vibration or white-balance adjustment) or a specific visual indication (which may or may not be the same as the visual indication in the case of vibration or white-balance adjustment) displayed in the finder.

If it is determined in step S162 that the evaluation flag of the check result indicates "OK", an evaluation flag indicating "OK" for the check item "exposure adjustment" is stored in association with the frame number (step S164).

After storing the frame number and the evaluation flag for the check item "exposure adjustment" in steps S163 and S164, or if it is determined in step S161 that the check result is the same as the check result of the previous frame, the CPU 11 determines that all check items have been checked, and determines whether or not there is any check item with a different result from the result of the previous frame (step S165).

If it is determined in step S165 that there is a check item with a different result from the result of the previous frame, the frame number and the evaluation flag are stored (step S166). In this case, for a check item with a different result from the result of the previous frame, the evaluation flag stored in steps S144 or 145, 149 or 150, or 163 or 164 is stored. For a check item with the same result as the result of the previous frame, the same evaluation flag as that of the previous frame is stored.

Then, the flowchart of the metadata generation process ends. If it is determined in step S165 that there is no check item with a different result from the result of the previous frame, the current frame have been captured under the same conditions as the previous frame, and, as discussed above, there is no need for recording metadata. Thus, the flowchart of the metadata generation process ends.

The thus generated metadata stored in step S166 is packetized into packets in the manner described above, and, as shown in, for example, FIG. 7, the packets are multiplexed in association with the packets of the compressed captured image data and the packets of the compressed audio data of the corresponding number of frames.

As shown in FIG. 7, the metadata includes a frame number of a frame having any different check result from the previous frame, and evaluation flags for all check items with respect to this frame. In the example shown in FIG. 7, it is assumed that there are check items other than vibration, white balance, and exposure adjustment and a total of N check items are provided.

In the first embodiment, an evaluation flag indicating "OK" or "NG" is recorded for each check item. As shown in FIG. 8, an evaluation value may be recorded in association with a frame number for each check item.

In the first embodiment, an evaluation flag or an evaluation value for each check item is generated as metadata serving as defect-check information and is recorded in association with each of the frames, which are possibly defective. Alternatively, after evaluation flags or evaluation values for a plurality of check items are stored with respect to all frames, when the resulting evaluation flags or evaluation values are recorded as metadata, the stored evaluation flags or evaluation values for the plurality of check items may be used to overall evaluate each of the frames, and the overall evaluation result may be recorded as metadata onto a disk medium.

Figures 9, 10:
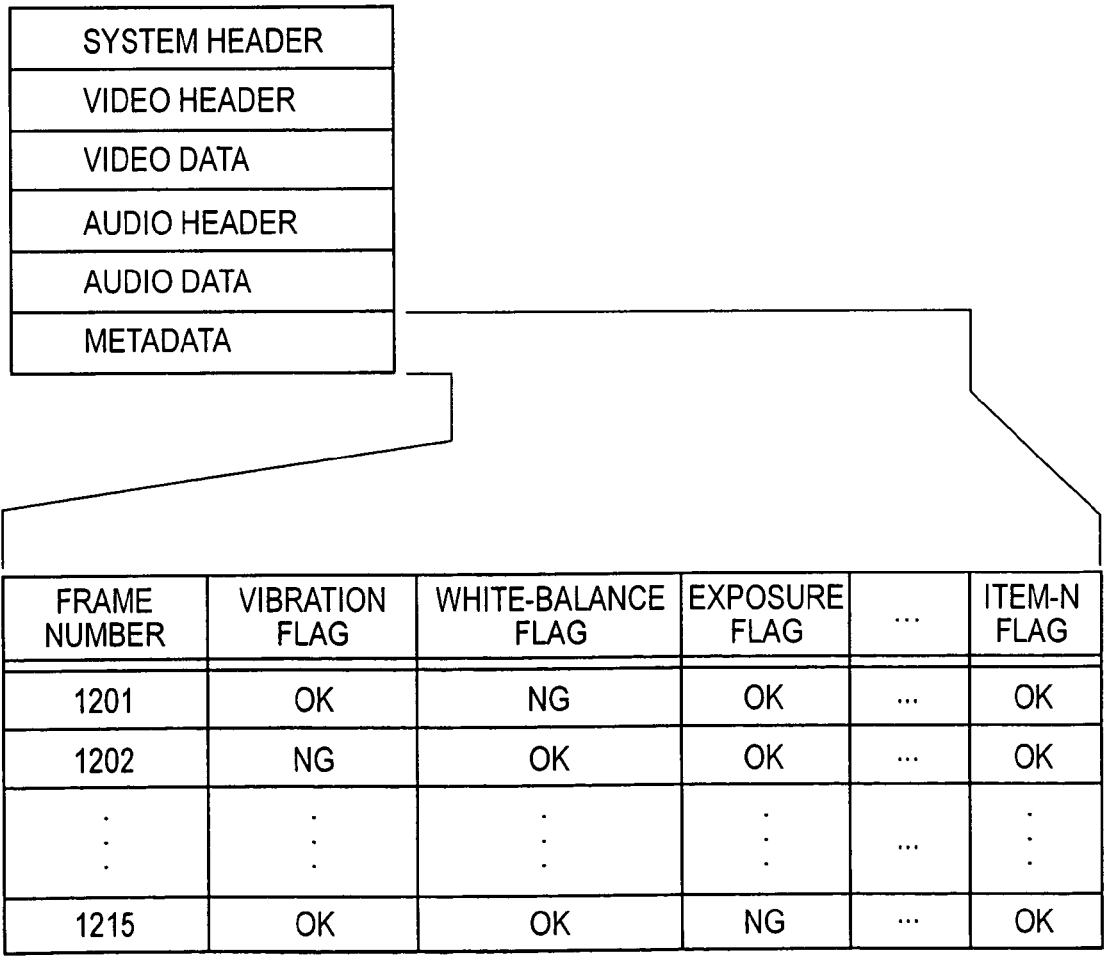
FIG. 9 is a diagram showing still another example metadata according to the embodiment.
FIG. 10 is a diagram showing another exemplary multiplexing format of metadata used in the image capturing apparatus shown in FIG. 1.

FIG. 9 shows example metadata in a case where an overall evaluation result for a plurality of check items is recorded as metadata. In the example shown in FIG. 9, a frame whose evaluation is different from the previous frame and the different evaluation flag are recorded as metadata. Specifically, when a given frame is assigned an evaluation flag indicating "OK", it is determined that the evaluation flags assigned to the frames up to the previous frame indicate "NG". When a given frame is assigned an evaluation flag indicating "NG", it is determined that the evaluation flags assigned to the frames up to the previous frame indicate "OK".

In this overall evaluation system, if an evaluation flag for one of the plurality of check items indicates "NG", the evaluation flag of the overall evaluation result may indicate "NG". Alternatively, the user may select some of the check items for overall evaluation in advance. In this case, if the evaluation flag of one of the check items selected by the user indicates "NG", the evaluation flag of the overall evaluation result may indicate "NG". The user may select one check item, such as vibration.

In the foregoing description, the metadata is packetized, and the resulting packets are multiplexed as a program stream with the packets of the compressed image data and the packets of the compressed audio data. The metadata may be added to each GOP data.

FIG. 10 shows an example GOP compressed-data format for captured image information and audio information.

This compressed-data format is used for the MPEG-2 data compression method. The GOP compressed-data format for the MPEG-2 method is composed of a system header, a video header, video data, an audio header, and audio data. The video data includes compressed captured image data in units of GOP consisting of, for example, 15 frames. The audio data includes compressed audio data for the corresponding period of time.

In the example shown in FIG. 10, metadata associated with captured image data in units of GOP is additionally recorded in the GOP compressed-data format. As shown in FIG. 10, the metadata includes a frame number of each of 15 frames constituting a GOP, and evaluation flags for a plurality of check items with respect to the frame with this frame number, such as a vibration flag, a white-balance flag, and an exposure flag. Instead of the evaluation flags, the metadata may include evaluation values of the individual check items. The frame numbers are included in time code contained in the system header.

Figures 11, 12:
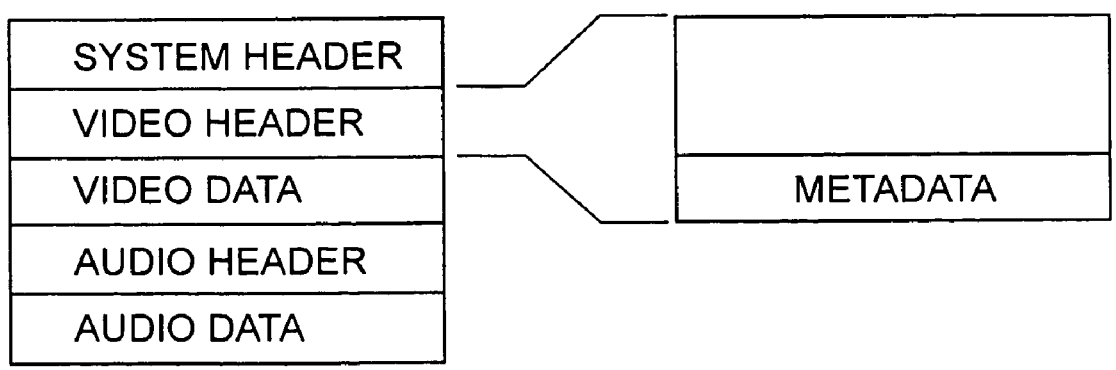
FIG. 11 is a diagram showing an exemplary modification of the metadata structure shown in FIG. 10.
FIG. 12 is a diagram showing still another exemplary multiplexing format of metadata used in the image capturing apparatus shown in FIG. 1.

Alternatively, as in the example shown in FIG. 9, instead of recording evaluation flags or evaluation values for all of a plurality of check items with respect to each of the 15 frames constituting a GOP, the plurality of check items may be overall evaluated, and the overall evaluation result may be determined, as shown in, for example, FIG. 11. The resulting overall evaluation result may be recorded as metadata in units of GOP.

FIG. 12 shows still another example metadata recorded in the GOP compressed-data format complying with MPEG-2. In this example, the metadata is recorded in the video header. This metadata may have the structure shown in FIG. 10 or 11.

Editing Mode

Figure 13:
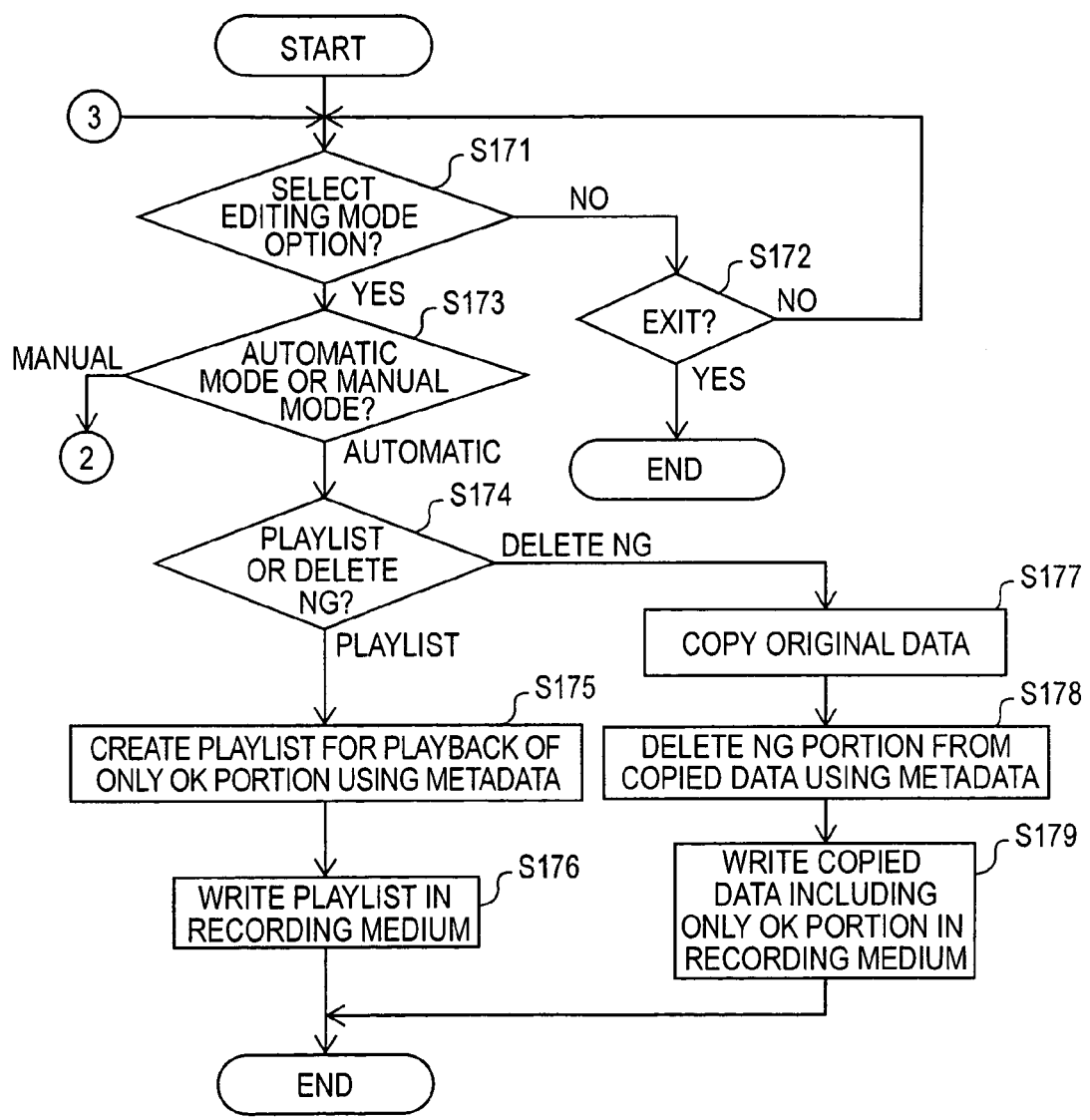
FIG. 13 is a flowchart showing an operation of the image capturing apparatus shown in FIG. 1 to perform processing in the editing mode.
Figure 14:
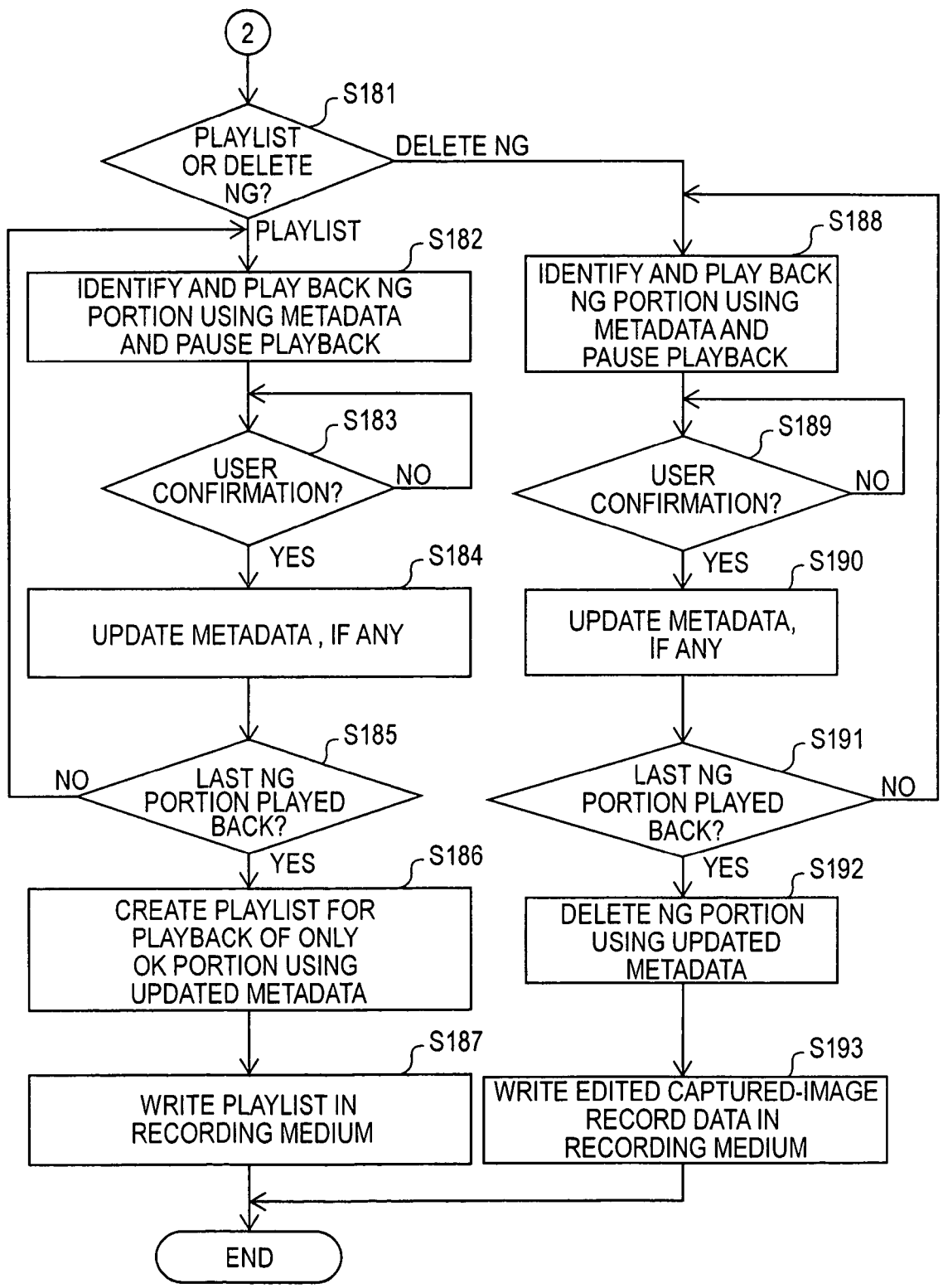
FIG. 14 is a flowchart showing the an operation of the image capturing apparatus shown in FIG. 1 to perform processing in the editing mode.

The editing-mode operation executed in step S123 shown in FIG. 4 will now be described with reference to a flowchart shown in FIGS. 13 and 14 in conjunction with edited files shown in FIGS. 15 to 17. The steps shown in the flowchart of FIGS. 13 and 14 are also executed by the CPU 11 according to the program stored in the ROM 13 using the RAM 14 as a work area.

First, the CPU 11 determines whether or not an editing mode option has been selected and input (step S171). If it is determined that no editing mode option has been selected or input, the CPU 11 determines whether or not an operation to exit the editing mode has been input (step S172). If it is determined that the operation to exit the editing mode has not been input, the flow returns to step S171. If the operation to exit the editing mode has been input, the process in the editing mode ends.

If it is determined in step S171 that an editing mode option has been selected and input, the CPU 11 determines whether the automatic editing mode or the manual editing mode has been selected (step S173).

If it is determined in step S173 the automatic editing mode has been selected, the CPU 11 further determines whether a playlist option or an "NG" deletion option has been selected (step S174).

The playlist is a list of pairs of frame numbers of the first and last frames of good image scenes to allow the user to play back only good images while skipping defective captured-images. The pairs are listed from captured record data (including compressed captured image data, compressed audio data, and metadata) recorded on a disk medium using the metadata.

The "NG" deletion option is an option using an editing function for deleting defective captured-image portions from the captured record data recorded on the disk medium to generate new captured record data including only well-captured image portions and writing the generated captured record data in the disk medium.

If it is determined in step S174 that the playlist option has been selected, the CPU 11 retrieves and decodes the metadata associated with the captured record data recorded on the disk medium 23, and generates a playlist composed of pairs of the first and last frame numbers of image scenes other than defective captured-image portions (step S175).

The captured record data recorded on the disk medium 23 is managed on a file-by-file basis, wherein each file covers a cycle from the start of the capturing operation to the end (capture-stop). The playlist is generated for each file.

After generating a playlist, the CPU 11 records the generated playlist onto the disk medium 23 on a file-by-file basis (step S176). Then, the processing routine in the editing mode ends.

Figures 15, 16, 17:
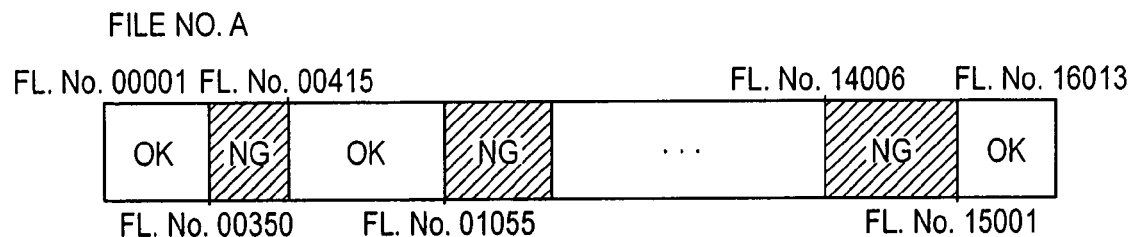
FIG. 15 is a diagram showing the editing mode according to the embodiment.
FIG. 16 is a diagram showing the editing mode according to the embodiment.
FIG. 17 is a diagram showing the editing mode according to the embodiment.

FIG. 15 shows example new captured record data recorded on the disk medium 23. Each file includes a playlist added to the captured record data. As shown in FIG. 15, playlist data includes data of pairs of the first and last frame numbers of good image portions except for a defective captured-image portion. For example, in file No. A, a playlist includes frames from FL. No. 00001 to FL. No. 00350, frames from FL. No. 00415 to FL. No. 01055, . . . , and frames from FL. No. 15001 to FL. No. 16013. Thus, a playlist may include one or a plurality of sets of two frame numbers.

FIG. 16 shows the data structure of file No. A shown in FIG. 15 in which "OK" portions representing good image portions and "NG" portions representing bad image portions in the captured record data are developed with respect to the time axis according to the generated playlist. At the time of playback, the captured record data of file No. A is played back according to the playlist, thus allowing the user to play back only the "OK" portions while skipping the "NG" portions indicated by shading in FIG. 16.

Next, the "NG" deletion option in the editing mode will now be described. If it is determined in step S174 that the "NG" deletion option has been selected, the CPU 11 retrieves the captured record data for each file from the disk medium 23. In the first embodiment, the original captured record data including a defective captured-image is not deleted, and the data that is edited so that the "NG" portions are deleted is added to each file and is recorded. Thus, the retrieved captured record data is regarded as different data (copied data) from the original captured record data (step S177), and the copied data is edited to delete the "NG" portions therefrom (step S178).

In step S178, for example, in FIG. 16, all shaded "NG" portions are deleted from the captured record data of file No. A. Then, the copied data including only the "OK" portions because the "NG" portions are deleted in step S178 is added to each file and is recorded onto the disk medium 23 as edited captured record data (step S179). Then, the processing routine in the editing mode ends.

FIG. 17 shows an example edited data recorded on the disk medium 23 after performing the "NG" deletion editing operation. The "NG" deletion editing operation allows the original captured record data and the edited captured record data including only the OK portions to be recorded in each the file on the disk medium.

If it is determined in step S173 that the manual editing mode has been selected, the CPU 11 further determiners whether a playlist option or an "NG" deletion option has been selected (step S181 shown in FIG. 14).

If it is determined in step S181 that the playlist option has been selected, the CPU 11 retrieves and decodes the metadata associated with the captured record data recorded on the disk medium 23, and plays back a defective captured-image portion. The defective captured-image portion is displayed on the display unit 6 to the user, and the playback is paused (step S182). Then, the CPU 11 waits for the user to confirm the check result "NG" (step S183). At this time, a message, such as "is this image skipped as a defective image?", is displayed together with the played back defective captured-image portion. A method how the user can confirm the check result in response to the message is also displayed on the screen. The user confirms the check result while viewing the screen.

If it is determined in step S183 that the user confirms the check result, the confirmation from the user is checked. If the user desires to change the check result from "NG" to "OK", the corresponding portion of the metadata is updated (step S184). If the user confirms the check result "NG", the metadata is not updated. The metadata to be updated is not the one recorded on the disk medium but the one retrieved and stored in the buffer.

Then, it is determined whether or not the last "NG" portion of the captured record data has been played back (step S185). If it is determined that the last "NG" portion has not been played back, the flow returns to step S182, and the processing after step S182 is repeatedly performed.

If it is determined in step S185 that the last "NG" portion has been played back, the metadata updated in step S184 is used to create a playlist for allowing the user to play back only OK portions (step S186). The created playlist is recorded for each file onto the disk medium 23 in the manner similar to that in the automatic editing mode described above (step S187). Then, the processing routine in the editing mode ends.

If it is determined in step S181 that the "NG" deletion option has been selected, the CPU 11 retrieves and decodes the metadata associated with the captured record data recorded on the disk medium 23, and plays back a defective captured-image portion. The defective captured-image portion is displayed on the display unit 6 to the user, and the playback is paused (step S188). Then, the CPU 11 waits for the user to confirm the check result "NG" (step S189). At this time, a message, such as "is this image deleted as a defective image?", is displayed together with the played back defective captured-image portion. A method how the user can confirm the check result in response to the message is also displayed on the screen. The user confirms the check result while viewing the screen.

If it is determined in step S189 that the user confirms the check result, the confirmation from the user is checked. If the user desires to change the check result from "NG" to "OK", the corresponding portion of the metadata is updated (step S190). If the user confirms the check result "NG", the metadata is not updated. The metadata to be updated is not the one recorded on the disk medium but the one retrieved and stored in the buffer.

Then, it is determined whether or not the last "NG" portion of the captured record data has been played back (step S191). If it is determined that the last "NG" portion has not been played back, the flow returns to step S188, and the processing after step S188 is repeatedly performed.

If it is determined in step S191 that the last "NG" portion has been played back, the metadata updated in step S190 is used to perform "NG" deletion processing in a similar manner to the "NG" deletion editing processing in the automatic editing mode described above (step S192). Specifically, all "NG" portions identified by the updated metadata are deleted, and the edited captured record data including only OK portions is generated. The edited captured record data is recorded for each file onto the disk medium 23 in a similar manner to that in the automatic editing mode described above (step S193). Then, the processing routine in the editing mode ends.

in the manual editing mode, a user-acceptable image can be included in a playlist so that the image can be played back without being skipped or can be edited without being deleted if it is determined that this image is a defective image caused by a capturing error based on the metadata generated at the time of capturing and recording. It is therefore possible to reflect user's intention in the editing operation.

SECOND EMBODIMENT

Next, a captured image data processing apparatus according to a second embodiment of the present invention that loads image data captured and recorded on a recording medium by the image capturing apparatus according to the first embodiment and that stores the loaded data in, for example, a large-capacity data storage unit will be described. The captured image data processing apparatus according to the second embodiment has functions for editing the captured record data retrieved from the recording medium in a similar manner to that in the editing mode of the image capturing apparatus according to the first embodiment, and storing the edited data in the data storage unit.

Figure 18:
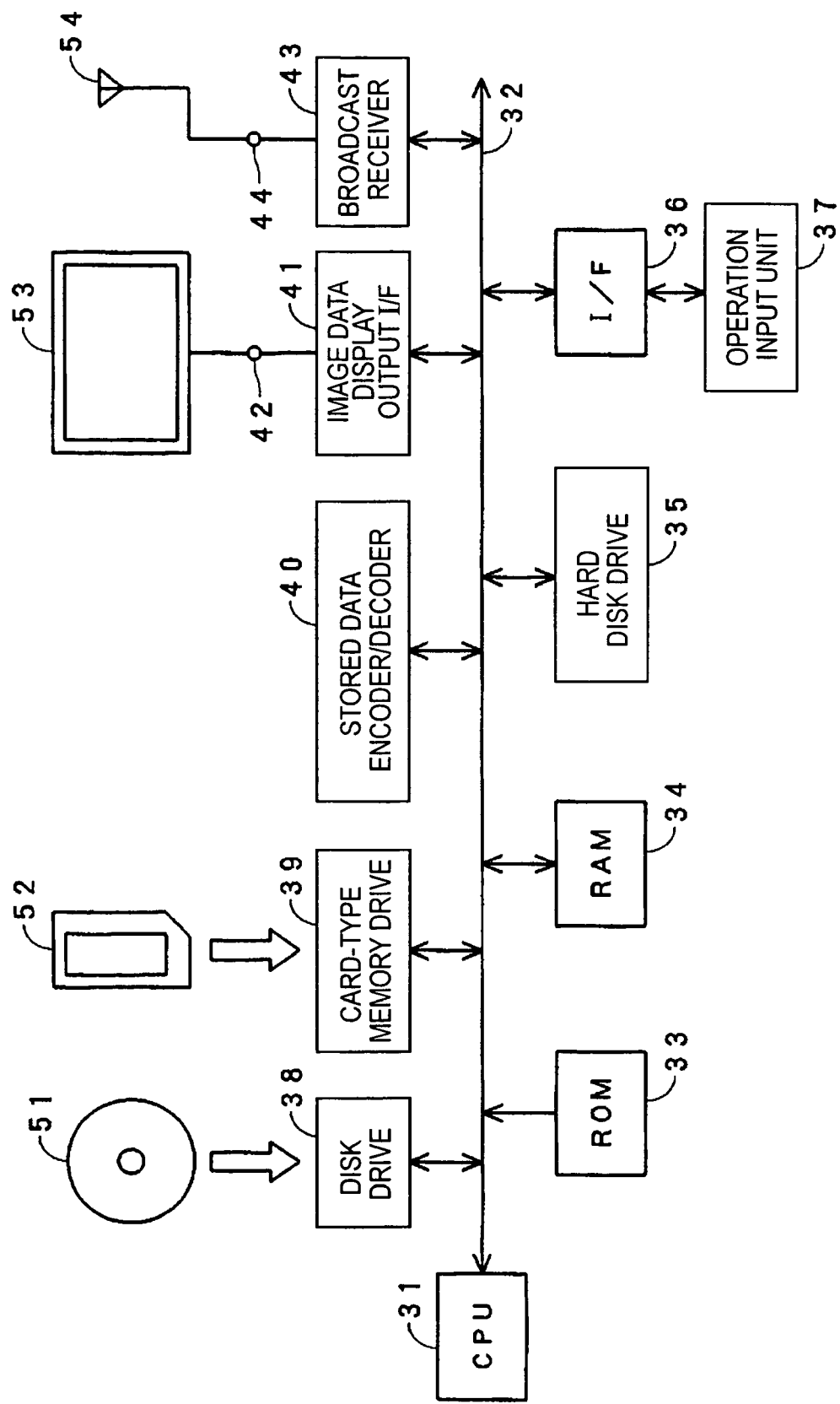
FIG. 18 is a diagram showing an example structure of an apparatus for processing captured image data according to another embodiment of the present invention.

FIG. 18 is a block diagram of an exemplary hard disk recording and playback apparatus as an implementation of the captured image data processing apparatus according to the second embodiment.

In the hard disk recording and playback apparatus, a program ROM 33 and a work area RAM 34 are connected to a CPU 31 via a system bus 32. A hard disk drive 35, an operation input interface 36 connected to an operation input unit 37, a disk drive 38, a card-type memory drive 39, a stored data encoder/decoder 40, an image data display output interface 41, and a broadcast receiver 43 are connected to the system bus 32.

The hard disk drive 35 is a large-capacity data storage unit for storing received broadcast signals and captured image data loaded from a disk medium 51 and a card-type memory 52, as discussed below.

Display image data from the image data display output interface 41 is supplied to a display 53 via an image signal output terminal 42 to display an image.

The disk medium 51 is loaded in the disk drive 38. When the disk medium 51 is loaded in the disk drive 38, the CPU 31 retrieves the captured record data to the disk drive 38 from the disk medium 51 in response to an instruction to load the captured record data from the operation input unit 37, and stores the retrieved data into the hard disk drive 35 via the stored data encoder/decoder 40 after or without editing the data in the manner discussed below.

In response to an instruction to play back the captured record data instead of a instruction to load it, the CPU 31 retrieves the captured record data to the disk drive 38 from the disk medium 51, and supplies the retrieved captured record data to the display 53 via the image data display output interface 41 to play back the captured image.

The card-type memory 52 is loaded in the card-type memory drive 39. In this example, the card-type memory 52 also stores captured record data having a similar format to that stored in the disk medium 23, described above. When the card-type memory 52 is loaded in the card-type memory drive 39, the CPU 31 retrieves the captured record data to the card-type memory drive 39 from the card-type memory 52 in response to an instruction to load the captured record data from the operation input unit 37, and stores the retrieved data into the hard disk drive 35 via the stored data encoder/decoder 40 after or without editing the data in the manner described below.

The stored data encoder/decoder 40 converts (encodes) the retrieved data to the data format for hard disk storage, and decodes the data format of the data read from the hard disk.

The broadcast receiver 43 is connected to a broadcast receiving antenna 54 via an antenna terminal 44. A broadcast signal received by the broadcast receiving antenna 54 is supplied to the display 53 via the image data display output interface 41 to play back an image.

The broadcast signal received by the broadcast receiver 43 is also encoded to a data format for hard disk recording by the stored data encoder/decoder 40. The encoded data is then supplied to the hard disk drive 35 and is written in the hard disk.

Next, the operation of the hard disk recording and playback apparatus according to the second embodiment to load the captured record data will be described with reference to a flowchart shown in FIGS. 19 and 20. The steps shown in the flowchart of FIGS. 19 and 20 are executed by the CPU 31 according to the program stored in the ROM 33 using the RAM 34 as a work area.

Figure 19:
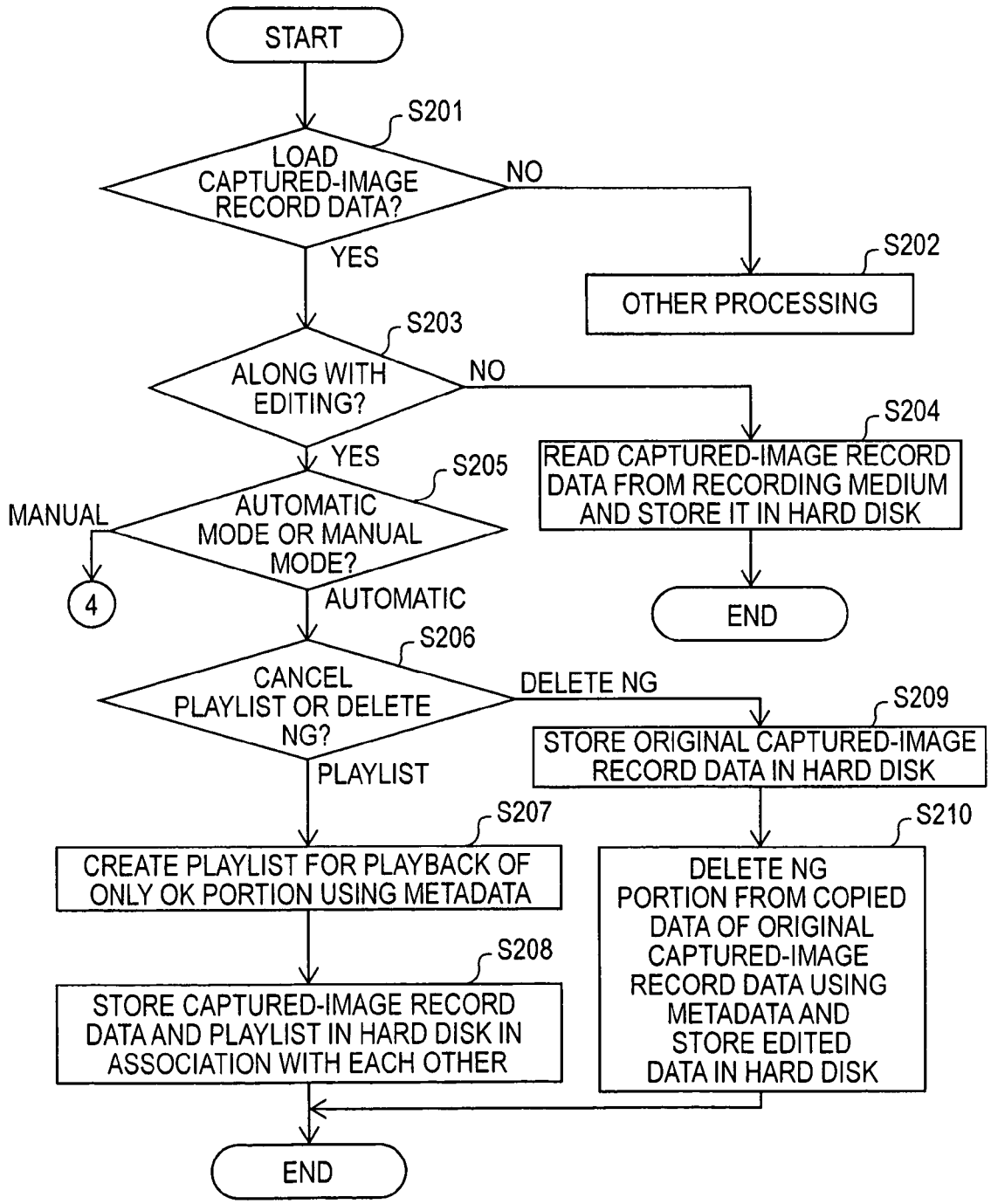
FIG. 19 is a flowchart showing an operation of the apparatus shown in FIG. 18.
Figure 20:
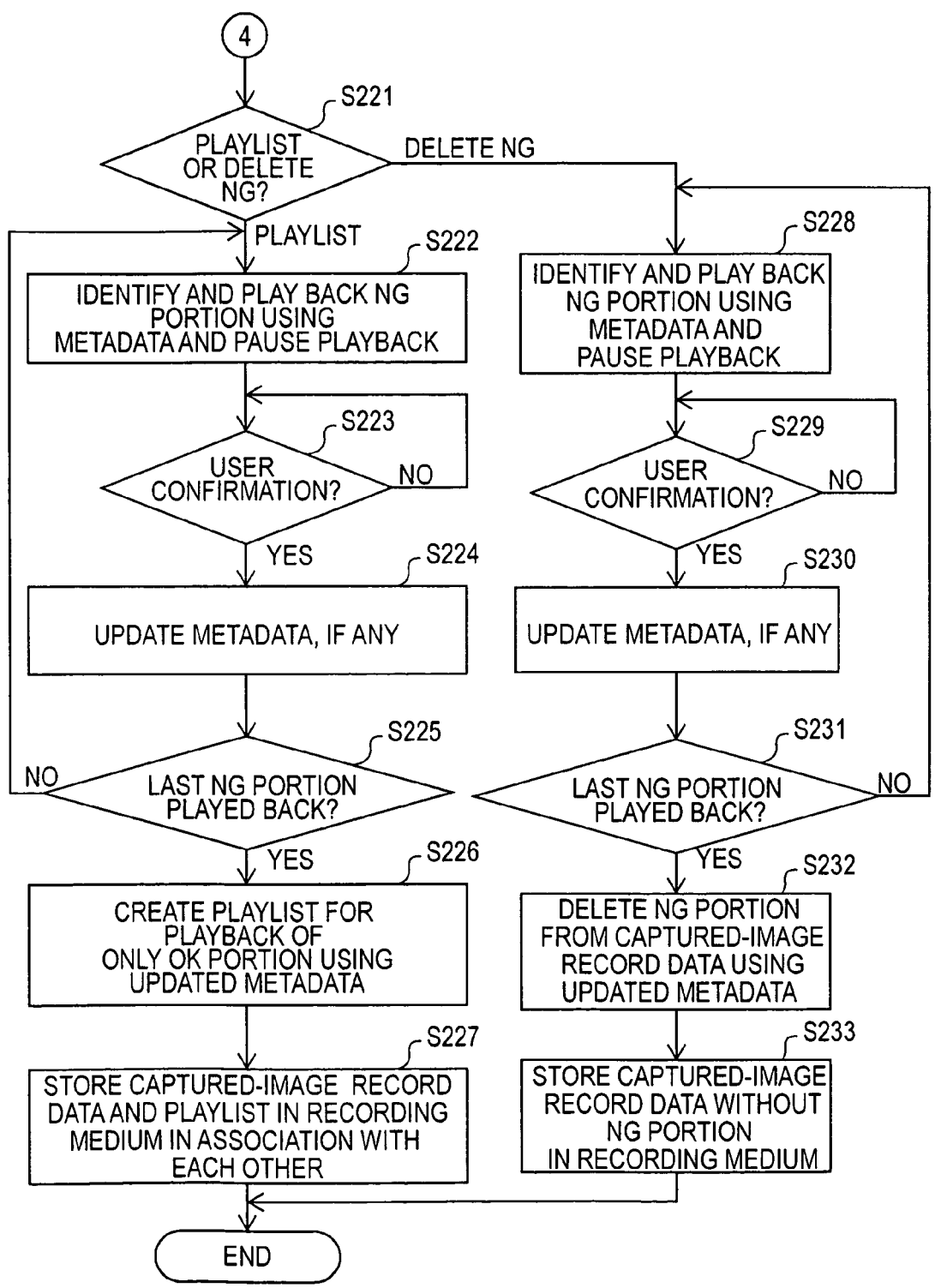
FIG. 20 is a flowchart showing the operation of the apparatus shown in FIG. 18.

As shown in FIG. 19, first, the CPU 31 determines whether or not an instruction to load the captured record data has issued (step S201). If the instruction to load the captured record data has not been issued, other requested processing is performed (step S202).

If it is determined in step S201 that the instruction to load the captured record data has been issued, it is determined whether or not the loading along with the editing operation has been requested (step S203). If it is determined that the loading along with the editing operation has not been requested, the captured record data is retrieved from the disk medium 51 or the card-type memory 52. Then, the retrieved data is encoded to a data format for hard disk recording by the stored data encoder/decoder 40, and is written in the hard disk by the hard disk drive 35 (step S204).

If it is determined in step S203 that the loading along with the editing operation has been requested, it is determined whether the automatic editing mode or the manual editing mode has been selected (step S205).

If it is determined in step S205 that the automatic editing mode has been selected, the CPU 31 further determines whether a playlist option or an "NG" deletion option has been selected (step S206).

If it is determined in step S206 that the playlist option has been selected, the CPU 31 retrieves and decodes the metadata associated with the captured record data recorded on the disk medium 51 or the card-type memory 52, and generates a playlist composed of pairs of the first and last frame numbers of image scenes other than defective captured-image portions for each file in a similar manner to that described above in the first embodiment (step S207).

After generating a playlist, the CPU 31 adds the generated playlist for each file to the captured record data retrieved from the disk medium 51 or the card-type memory 52, and stores the resulting data into the hard disk drive 35 via the stored data encoder/decoder 40 (step S208). Then, the processing routine for loading the captured record data ends.

If it is determined in step S206 that the "NG" deletion option has been selected, the CPU 31 retrieves the captured record data for each file from the disk medium 51 or the card-type memory 52. In the second embodiment, the original captured record data including a defective captured-image is not deleted, and the data that is edited so that the "NG" portions are deleted is added to each file and is recorded. Thus, the retrieved captured record data is stored as the original captured record data into the hard disk drive 35 (step S209).

Besides the original captured record data, the original captured record data is copied and loaded into the buffer as copied data. The copied data is edited so that the "NG" portions are deleted in a similar manner to that described above in the first embodiment, and the edited data after performing "NG" deletion is recorded in addition to the original captured record data stored for each file on the hard disk drive 35 (step S210). Then, the processing routine for loading the captured record data along with the editing operation ends.

If it is determined in step S205 that the manual editing mode has been selected, the CPU 31 further determines whether a playlist option or an "NG" deletion option has been selected (step S221 shown in FIG. 20).

If it is determined in step S221 that the playlist option has been selected, the CPU 31 retrieves and decodes the metadata associated with the captured record data recorded on the disk medium 51 or the card-type memory 52, and plays back a defective captured-image portion. The defective captured-image portion is displayed on the display 53 to the user, and the playback is paused (step S222). Then, the CPU 31 waits for the user to confirm the check result "NG" (step S223). At this time, a message, such as "is this image skipped as a defective image?", is displayed together with the played back defective captured-image portion. A method how the user can confirm the check result in response to the message is also displayed on the screen. The user confirms the check result while viewing the screen.

If it is determined in step S223 that the user confirms the check result, the confirmation from the user is checked. If the user desires to change the check result from "NG" to "OK", the corresponding portion of the metadata is updated (step S224). If the user confirms the check result "NG", the metadata is not updated. The metadata to be updated is not the one recorded on the disk medium but the one retrieved and stored in the buffer.

Then, it is determined whether or not the last "NG" portion of the captured record data has been played back (step S225). If it is determined that the last "NG" portion has not been played back, the flow returns to step S222, and the processing after step S222 is repeatedly performed.

If it is determined in step S225 that the last "NG" portion has been played back, the metadata updated in step S224 is used to create a playlist for allowing the user to play back only OK portions (step S226). The created playlist is recorded for each file onto the hard disk drive 35 in association with the captured record data retrieved from the disk medium 51 or the card-type memory 52 (step S227). Then, the processing routine for loading the captured record data along with the editing operation ends.

If it is determined in step S221 that the "NG" deletion option has been selected, the CPU 31 retrieves and decodes the metadata associated with the captured record data recorded on the disk medium 51 or the card-type memory 52, and plays back a defective captured-image portion. The defective captured-image portion is displayed on the display unit 53 to the user, and the playback is paused (step S228). Then, the CPU 31 waits for the user to confirm the check result "NG" (step S229). At this time, a message, such as "is this image deleted as a defective image?", is displayed together with the played back defective captured-image portion. A method how the user can confirm the check result in response to the message is also displayed on the screen. The user confirms the check result while viewing the screen.

If it is determined in step S229 that the user confirms the check result, the confirmation from the user is checked. If the user desires to change the check result from "NG" to "OK", the corresponding portion of the metadata is updated (step S230). If the user confirms the check result "NG", the metadata is not updated. The metadata to be updated is not the one recorded on the disk medium but the one retrieved and stored in the buffer.

Then, it is determined whether or not the last "NG" portion of the captured record data has been played back (step S231). If it is determined that the last "NG" portion has not been played back, the flow returns to step S228, and the processing after step S228 is repeatedly performed.

If it is determined in step S231 that the last "NG" portion has been played back, the metadata updated in step S230 is used to perform "NG" deletion processing in a similar manner to the "NG" deletion editing processing in the automatic editing mode described above (step S232). Specifically, all "NG" portions identified by the updated metadata are deleted, and the edited captured record data including only OK portions is generated. The original captured record data and the edited captured record data are recorded for each file onto the hard disk drive 35 in a similar manner to that in the automatic editing mode described above (step S233). Then, the processing routine for loading the captured record data along with the editing operation ends.

In the hard disk recording and playback apparatus, playback modes, such as a mode in which all loaded original captured record data are played back, a playlist-based playback mode using a playlist, and a playback mode in which edited captured record data that has been edited to delete NG portions is played back, are provided. The user can select and execute one of the playback modes.

In the playlist-based playback mode, only the frame period from the first frame to the last frame specified in a playlist is played back. The playlist-based playback mode allows any defective captured-image portion to be skipped so that it is not played back. In this case, it is only required on the playback apparatus side to play back the data according to the playlist in order to play back the data while skipping defective captured-image portions. Thus, unlike the related art described previously, there is no need for analyzing an image while playing back the image.

In the playback mode in which edited captured record data is played back, edited captured record data without defective captured-image portions is played back. Thus, it is possible on the playback apparatus side to play back the defect-free image data without performing any additional processing.

In the foregoing description, evaluation values of an image are obtained on a frame-by-frame basis. However, it is also to be understood that evaluation values may be obtained on a field-by-field basis.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image capturing apparatus comprising:
   an image capturing device;
   compressing means for compressing image data captured with the image capturing device;
   obtaining means for obtaining, during the capturing by the image capturing device, defect-check information adapted to determine whether or not capturing has failed; and
   recording means for recording the defect-check information obtained by the obtaining means onto a recording medium in association with the corresponding image data compressed by the compressing means;
   wherein the image capturing apparatus has an editing mode in which the defect-check information recorded by the recording means in association with the compressed image data is retrieved from the recording medium to generate image playback range information based on the defect-check information, the image playback range information allowing only images other than an image for which it is determined that capturing has failed to be played back, and the generated image playback range information is recorded onto the recording medium.

2. The image capturing apparatus according to claim 1, wherein the defect-check information includes an evaluation value for a condition based on which it is determined whether or not capturing has failed, and the evaluation value is obtained and recorded for each image frame or image field.

3. The image capturing apparatus according to claim 1, wherein the defect-check information includes a given image frame or image field having an evaluation value for a condition based on which it is determined whether or not capturing has failed when the evaluation value of the given image frame or image field is different from an evaluation value of the previous image frame or field, and the evaluation value of the given image frame or image field.

4. The image capturing apparatus according to claim 1, wherein the compressing means generates compressed image data that can be encoded and decoded in units of groups, each being a group of a plurality of frames or a plurality of fields, and
   the defect-check information is added to the compressed image data in units of groups.

5. The image capturing apparatus according to claim 4, wherein the defect-check information includes an evaluation value for determining whether or not capturing has failed for each of the frames or fields in each group.

6. The image capturing apparatus according to claim 4, wherein the defect-check information includes an evaluation value for determining whether or not capturing has failed for each group.

7. The image capturing apparatus according to claim 1, wherein, in the editing mode, an image corresponding to the defect-check information retrieved from the recording medium is played back from the compressed image data retrieved from the recording medium, and is presented to a user to prompt the user to confirm whether or not the played back image is set as a defective image, the confirmation from the user is also used to generate the image playback range information, and the generated image playback range information is recorded onto the recording medium.

8. The image capturing apparatus according to claim 1, wherein the image capturing apparatus has an editing mode in which the defect-check information recorded by the recording means in association with the compressed image data is retrieved from the recording medium, and the defect-check information is used to update the image data recorded on the recording medium to image data from which an image portion for which it is determined that capturing has failed has been removed.

9. The image capturing apparatus according to claim 8, wherein, in the editing mode, an image corresponding to the defect-check information retrieved from the recording medium is played back from the compressed image data retrieved from the recording medium, and is presented to a user to prompt the user to confirm whether or not the played back image is set as a defective image, and the confirmation from the user is also used to update the image data recorded on the recording medium.

10. A captured image data processing apparatus for retrieving compressed image data obtained by compressing captured image data from a recording medium on which the compressed image data and defect-check information adapted to determine whether or not capturing has failed are recorded in association with each other, and for storing the retrieved compressed image data in a data storage unit, the captured image data processing apparatus comprising:
    editing means for, when storing the compressed image data in the data storage unit, retrieving the defect-check information from the recording medium, generating image playback range information based on the defect-check information, the image playback range information allowing only images other than an image for which it is determined that capturing has failed to be played back, and storing the generated image playback range information in the data storage unit in association with the compressed image data.

11. The captured image data processing apparatus according to claim 10, wherein the editing means, when storing the compressed image data in the data storage unit, plays back at least an image corresponding to the defect-check information retrieved from the recording medium from the compressed image data retrieved from the recording medium, presents the played back image to a user to prompt the user to confirm whether or not the played back image is set as a defective image, and also uses the confirmation from the user to generate the image playback range information.

12. A captured image data processing apparatus for retrieving compressed image data obtained by compressing captured image data from a recording medium on which the compressed image data and defect-check information adapted to determine whether or not capturing has failed are recorded in association with each other, and for storing the retrieved compressed image data in a data storage unit, the captured image data processing apparatus comprising:
    editing means for, when storing the compressed image data in the data storage unit, retrieving the defect-check information from the recording medium, and removing an image portion for which it is determined that capturing has failed based on the defect-check information from the compressed image data before storing the compressed image data in the data storage unit.

13. The captured image data processing apparatus according to claim 12, wherein the editing means, when storing the compressed image data in the data storage unit, plays back at least an image corresponding to the defect-check information retrieved from the recording medium from the compressed image data retrieved from the recording medium, presents the played back image to a user to prompt the user to confirm whether or not the played back image is set as a defective image, and also uses the confirmation from the user to remove an image portion for which it is determined that capturing has failed from the compressed image data before storing the compressed image data in the data storage unit.

14. A method for recording captured image data, comprising the steps of:
   compressing image data captured with an imaging device;
   obtaining defect-check information adapted to determine whether or not capturing has failed during the capturing by the image capturing device; and
   recording the defect-check information obtained in the step of obtaining defect-check information onto a recording medium in association with the corresponding captured image data compressed in the step of compressing image data;
   wherein an editing mode in which the defect-check information in association with the compressed image data is retrieved from the recording medium to generate image playback range information based on the defect-check information, the image playback range information allowing only images other than an image for which it is determined that capturing has failed to be played back, and the generated image playback range information is recorded onto the recording medium.

15. A captured image data processing method for retrieving compressed image data obtained by compressing captured image data from a recording medium on which the compressed image data and defect-check information adapted to determine whether or not capturing has failed are recorded in association with each other, and for storing the retrieved compressed image data in a data storage unit, the captured image data processing method comprising a step of when storing the compressed image data in the data storage unit, retrieving the defect-check information from the recording medium, generating image playback range information based on the defect-check information, the image playback range information allowing only images other than an image for which it is determined that capturing has failed to be played back, and storing the generated image playback range information in the data storage unit in association with the compressed image data.

16. A captured image data processing method for retrieving compressed image data obtained by compressing captured image data from a recording medium on which the compressed image data and defect-check information adapted to determine whether or not capturing has failed are recorded in association with each other, and for storing the retrieved compressed image data in a data storage unit, the captured image data processing method comprising a step of when storing the compressed image data in the data storage unit, retrieving the defect-check information from the recording medium, and removing an image portion for which it is determined that capturing has failed based on the defect-check information from the compressed image data before storing the compressed image data in the data storage unit.

17. A computer program product embodied in a computer readable medium storing a program allowing a computer to execute the steps of:
   compressing image data captured with an imaging device;
   obtaining defect-check information adapted to determine whether or not capturing has failed during the capturing by the image capturing device; and
   recording the defect-check information obtained in the step of obtaining defect-check information onto a recording medium in association with the corresponding captured image data compressed in the step of compressing image data;
   wherein an editing mode in which the defect-check information in association with the compressed image data is retrieved from the recording medium to generate image playback range information based on the defect-check information, the image playback range information allowing only images other than an image for which it is determined that capturing has failed to be played back, and the generated image playback range information is recorded onto the recording medium.

18. An image capturing apparatus comprising:
   an image capturing device;
   a compressing unit operable to compress image data captured with the image capturing device;
   an obtaining unit operable to obtain defect-check information adapted to determine whether or not capturing has failed during the capturing by the image capturing device; and
   a recording unit operable to record the defect-check information obtained by the obtaining unit onto a recording medium in association with the corresponding image data compressed by the compressing unit;
   wherein the image capturing apparatus has an editing mode in which the defect-check information recorded by the recording unit in association with the compressed image data is retrieved from the recording medium to generate image playback range information based on the defect-check information, the image playback range information allowing only images other than an image for which it is determined that capturing has failed to be played back, and the generated image playback range information is recorded onto the recording medium.

19. A captured image data processing apparatus for retrieving compressed image data obtained by compressing captured image data from a recording medium on which the compressed image data and defect-check information adapted to determine whether or not capturing has failed are recorded in association with each other, and for storing the retrieved compressed image data in a data storage unit, the captured image data processing apparatus comprising:
   an editing unit operable to, when storing the compressed image data in the data storage unit, retrieve the defect-check information from the recording medium, to generate image playback range information based on the defect-check information, the image playback range information allowing only images other than an image for which it is determined that capturing has failed to be played back, and to store the generated image playback range information in the data storage unit in association with the compressed image data.

20. A captured image data processing apparatus for retrieving compressed image data obtained by compressing captured image data from a recording medium on which the compressed image data and defect-check information adapted to determine whether or not capturing has failed are recorded in association with each other, and for storing the retrieved compressed image data in a data storage unit, the captured image data processing apparatus comprising:
   an editing unit operable to, when storing the compressed image data in the data storage unit, retrieve the defect-check information from the recording medium, and to remove an image portion for which it is determined that capturing has failed based on the defect-check information from the compressed image data before storing the compressed image data in the data storage unit.

21. An image capturing apparatus comprising:
   an image capturing device;

compressing means for compressing image data captured with the image capturing device;

obtaining means for obtaining, during the capturing by the image capturing device, defect-check information adapted to determine whether or not capturing has failed; and recording means for recording the defect-check information obtained by the obtaining means onto a recording medium in association with the corresponding image data compressed by the compressing means;

wherein the image capturing apparatus has an editing mode in which the defect-check information recorded by the recording means in association with the compressed image data is retrieved from the recording medium, and the defect-check information is used to update the image data recorded on the recording medium to image data from which an image portion for which it is determined that capturing has failed has been removed.

22. A method for recording captured image data, comprising the steps of:

compressing image data captured with an imaging device;

obtaining defect-check information adapted to determine whether or not capturing has failed during the capturing by the image capturing device; and recording the defect-check information obtained in the step of obtaining defect-check information onto a recording medium in association with the corresponding captured image data compressed in the step of compressing image data;

wherein an editing mode in which the defect-check information in association with the compressed image data is retrieved from the recording medium, and the defect-check information is used to update the image data recorded on the recording medium to image data from which an image portion for which it is determined that capturing has failed has been removed.

23. A computer program product embodied in a computer readable medium storing a program allowing a computer to execute the steps of:

compressing image data captured with an imaging device;

obtaining defect-check information adapted to determine whether or not capturing has failed during the capturing by the image capturing device; and recording the defect-check information obtained in the step of obtaining defect-check information onto a recording medium in association with the corresponding captured image data compressed in the step of compressing image data;

wherein an editing mode in which the defect-check information in association with the compressed image data is retrieved from the recording medium, and the defect-check information is used to update the image data recorded on the recording medium to image data from which an image portion for which it is determined that capturing has failed has been removed.

24. An image capturing apparatus comprising:

an image capturing device;

a compressing unit operable to compress image data captured with the image capturing device;

an obtaining unit operable to obtain defect-check information adapted to determine whether or not capturing has failed during the capturing by the image capturing device; and a recording unit operable to record the defect-check information obtained by the obtaining unit onto a recording medium in association with the corresponding image data compressed by the compressing unit;

wherein the image capturing apparatus has an editing mode in which the defect-check information recorded by the recording means in association with the compressed image data is retrieved from the recording medium, and the defect-check information is used to update the image data recorded on the recording medium to image data from which an image portion for which it is determined that capturing has failed has been removed.

* * * * *